US010567905B2

(12) United States Patent
Edge et al.

(10) Patent No.: US 10,567,905 B2
(45) Date of Patent: *Feb. 18, 2020

(54) SYSTEMS AND METHODS FOR LOCATING A MOBILE DEVICE USING ANGLE OF ARRIVAL AND INERTIAL SENSOR MEASUREMENTS

(71) Applicant: QUALCOMM Incorporated, San Diego, CA (US)

(72) Inventors: Stephen William Edge, Escondido, CA (US); Rayman Wai Pon, Cupertino, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,524

(22) Filed: Sep. 20, 2018

(65) Prior Publication Data

US 2019/0166453 A1    May 30, 2019

Related U.S. Application Data

(60) Provisional application No. 62/591,183, filed on Nov. 27, 2017.

(51) Int. Cl.
*H04W 4/02* (2018.01)
*G01S 5/08* (2006.01)
(Continued)

(52) U.S. Cl.
CPC ............ *H04W 4/02* (2013.01); *G01S 5/0036* (2013.01); *G01S 5/0257* (2013.01); *G01S 5/06* (2013.01);
(Continued)

(58) Field of Classification Search
CPC .... H04W 4/02; G01S 5/06; G01S 5/10; G01S 5/0036; G01S 5/0257; G01S 5/08; G06F 1/1698

See application file for complete search history.

(56) References Cited

U.S. PATENT DOCUMENTS 8,971,797 B2 *  3/2015  Sheynblat ............. G01S 5/0036
                                              342/357.39
9,841,493 B2 * 12/2017  Sen ....................... H04W 64/00
(Continued)

FOREIGN PATENT DOCUMENTS

WO    WO-2014153501 A1 *  9/2014  ........... G01C 21/165

OTHER PUBLICATIONS

International Search Report and Written Opinion—PCT/US2018/057072—ISA/EPO—dated Feb. 14, 2019.

*Primary Examiner* — Julio R Perez
(74) *Attorney, Agent, or Firm* — Thien T. Nguyen

(57) ABSTRACT

Angle of arrival (AOA) and differential AOA (DAOA) positioning for a user equipment (UE) is enhanced by using the UE's inertial sensors to track UE motion and change in angular UE orientation. UE location may be computed, by the UE or a location server, using triangulation for AOA measurements relative to a global reference frame or using multilateration for DAOA measurements. The computed UE location may remain accurate even when the UE is moving while obtaining measurements. The UE can also use AOA and DAOA measurements using 3D angles to increase accuracy when the UE and measured base stations are not in the same horizontal plane. 3D angles can also be used to identify whether the UE is close to a serving base station to improve accuracy further. Various non-AOA measurements may also be used to supplement AOA and DAOA measurements.

34 Claims, 13 Drawing Sheets

(51) Int. Cl.
  *G01S 5/02*   (2010.01)
  *G01S 5/00*   (2006.01)
  *G01S 5/06*   (2006.01)
  *G01S 5/10*   (2006.01)
  *G06F 1/16*   (2006.01)
(52) U.S. Cl.
  CPC ............... *G01S 5/08* (2013.01); *G01S 5/10* (2013.01); *G06F 1/1698* (2013.01)

(56) References Cited

U.S. PATENT DOCUMENTS

| | | | |
|---|---|---|---|
| 2008/0100502 A1 | 5/2008 | Jantunen et al. | |
| 2009/0310501 A1* | 12/2009 | Catovic | H04W 24/08 370/252 |
| 2010/0323723 A1* | 12/2010 | Gerstenberger | G01S 5/0226 455/456.5 |
| 2011/0223940 A1 | 9/2011 | Zhong et al. | |
| 2013/0040648 A1* | 2/2013 | Yang | H04W 16/18 455/446 |
| 2013/0166246 A1 | 6/2013 | Rousu et al. | |
| 2017/0059689 A1* | 3/2017 | Edge | G01S 5/0289 |
| 2017/0111764 A1* | 4/2017 | Chou | H04L 12/6418 |
| 2018/0131540 A1* | 5/2018 | Malik | H04L 27/2628 |
| 2018/0259340 A1* | 9/2018 | Wakana | G01C 21/14 |
| 2018/0284149 A1* | 10/2018 | Kommi | G01C 21/165 |

\* cited by examiner

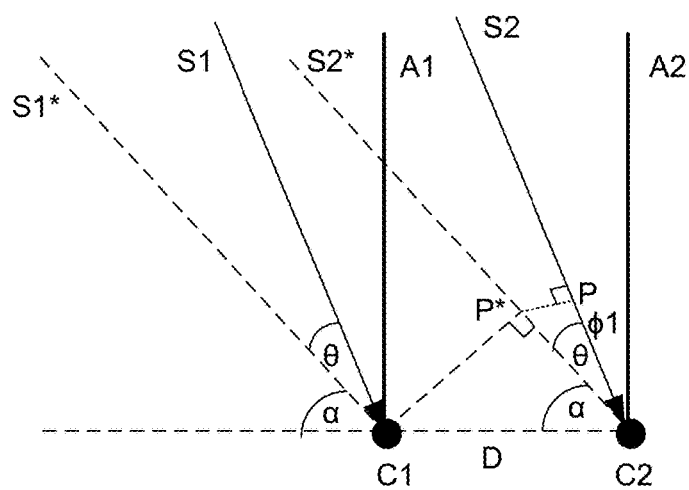
FIG. 6
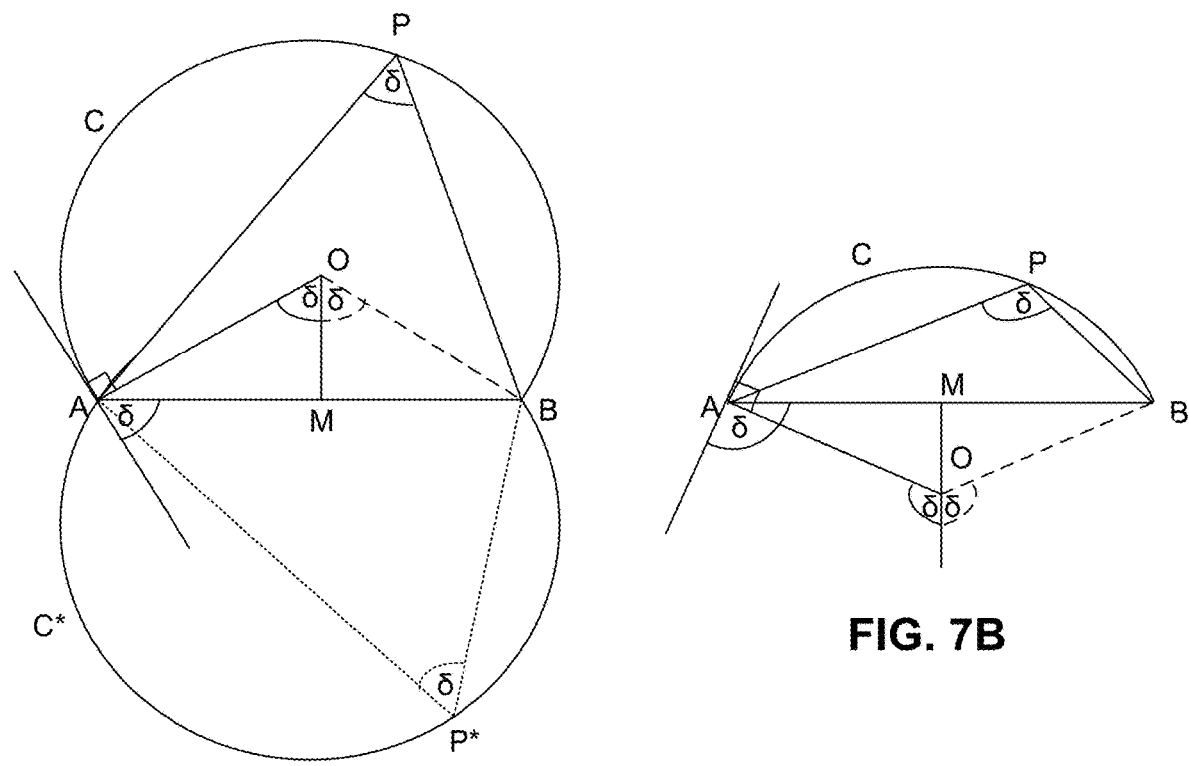
FIG. 7A
FIG. 7B

SYSTEMS AND METHODS FOR LOCATING A MOBILE DEVICE USING ANGLE OF ARRIVAL AND INERTIAL SENSOR MEASUREMENTS

RELATED APPLICATIONS

This application claims the benefit of U.S. Provisional Application No. 62/591,183, filed Nov. 27, 2017, entitled "SYSTEMS AND METHODS FOR LOCATING A MOBILE DEVICE USING ANGLE OF ARRIVAL AND INERTIAL SENSOR MEASUREMENTS", which is assigned to the assignee hereof, and incorporated by reference herein in its entirety.

BACKGROUND

Background Field

The subject matter disclosed herein relates to wireless communications systems, and more particularly to systems and methods for position or location of a user equipment (UE) in a wireless communications system using angle of arrival (AOA) measurements and inertial sensors.

Relevant Background

It is often desirable to know the location of a mobile device such as a cellular phone. For example, a location services (LCS) client may desire to know the location of a mobile device in the case of an emergency services call or to provide some service to the user of the mobile device such as navigation assistance or direction finding.

In angle of arrival (AOA) based positioning, a mobile device may measure the angles of arrival for downlink (DL) signals received from a plurality of base stations. For example, triangulation techniques may be used to calculate the UE location if the AOA measurements are relative to a global reference frame (e.g. a North-South-East-West horizontal frame) and if the positions of the measured base stations are known. Similar positioning is possible using multilateration if a UE cannot measure AOA relative to a global reference frame but can measure differential AOA (DAOA) between pairs of base stations. However, neither method can be used when a UE is moving and/or changing angular orientation because the AOA or DAOA measurements would be obtained at different UE locations and/or with respect to different reference frames. Techniques to overcome such degradation may therefore be beneficial.

SUMMARY

Techniques described herein solve these and other issues by providing for AOA and DAOA positioning in which inertial sensors within a UE are used to track horizontal (and vertical) motion and change in angular UE orientation. UE location then may be computed using triangulation for AOA measurements relative to a global reference frame or using multilateration based on differential AOA measurements without a global reference frame. Depending on desired functionality, the UE can report the sensor measurements to a location server along with the AOA measurements to allow the server to calculate the location, or the UE can perform the calculation if provided with base station coordinates by the location server or via broadcast. The UE can also make use of AOA measurements using 3D angles to increase accuracy when the UE and base stations are not in the same horizontal plane. 3D angles can also be used to identify whether the UE may be close to a serving base station where there may be a high angle of elevation. Non-AOA measurements may be used to supplement AOA measurements.

A first example method of determining a location of a user equipment (UE), according to the description, comprises: obtaining, with the UE at a first time, a first Angle Of Arrival (AOA) measurement of Radio Frequency (RF) signals received by the UE from a first base station, obtaining, using one or more inertial sensors of the UE, first sensor location information indicative of movement of the UE between the first time and a second time, and obtaining, with the UE at the second time, a second AOA measurement of RF signals received by the UE from a second base station. The method further comprises providing location information to a location determining entity, the location information comprising information indicative of the first AOA measurement, the first sensor location information, and the second AOA measurement.

Alternative embodiments of the method may include one or more of the following features. The location information further may comprise information indicative of the first time, the second time, and one or more times at which measurements associated with the first sensor location information were taken. The method further may comprise obtaining a differential AOA (DAOA) measurement between the first base station and the second base station based on the first AOA measurement and the second AOA measurement, and including, in the location information, information indicative of the DAOA measurement. The method further may comprise obtaining a measurement of a second angle between the first base station and the second base station based on the first AOA measurement and the second AOA measurement, wherein the measurement of the second angle is independent of the DAOA measurement, and including, in the location information, information indicative of the measurement of the second angle. The second angle may comprise an angle of elevation or an azimuth angle. The location determining entity may comprise a location server. The location server may determine a location for the UE based at least in part on the information indicative of the first AOA measurement, the first sensor location information, and the second AOA measurement. The UE may comprise the location determining entity, and the method may further comprise determining a location for the UE based at least in part on the information indicative of the first AOA measurement, the first sensor location information, and the second AOA measurement. The first sensor location information may comprise information regarding the UE including a velocity, acceleration, change in location, orientation, or change in orientation of the UE, or any combination thereof. The method further may comprise adjusting the first AOA measurement, the second AOA measurement or both AOA measurements based on a common orientation for the UE at the first time and at the second time, wherein the location information is based on the common orientation for the UE. The UE may be at a first location at the first time and may be at a second location, different to the first location, at the second time. The method further may comprise obtaining, with the UE at a third time and at a third location, different to the first location and the second location, a third AOA measurement of RF signals received by the UE from a third base station, obtaining, using the one or more inertial sensors of the UE, second sensor location information indicative of movement of the UE between the second time and the third time, and including, in the location information, information indicative of the third AOA measurement and the second sensor location information, wherein the location determining entity determines a location for the UE based at least in part on the information indicative of the third AOA measurement and the second sensor location information. The method further may comprise obtaining, with the UE at one or more times, one or more non-AOA and non-Differential AOA (DAOA) measurements of RF signals received by the UE from one or more base stations, and including, in the location information, information indicative of the one or more non-AOA and non-DAOA measurements. The one or more non-AOA and non-DAOA measurements may comprise: a Time Of Arrival (TOA) measurement, a Reference Signal Time Difference (RSTD) measurement, a Round Trip signal propagation Time (RTT) measurement, a Received Signal Strength Indicator (RSSI) measurement, a Reference Signal Received Power (RSRP) measurement, a Reference Signal Received Quality (RSRQ) measurement, or any combination thereof. The one or more base stations may include the first base station, the second base station, or both base stations. The one or more times may include the first time, the second time, or both times.

A second example method of determining a location of a user equipment (UE), according to the disclosure, comprises receiving, at a location server, location information from the UE, wherein the location information comprises information indicative of a first Angle Of Arrival (AOA) measurement, taken by the UE at a first time, of Radio Frequency (RF) signals received by the UE from a first base station, first sensor location information measured by one or more inertial sensors of the UE, the first sensor location information indicative of movement of the UE between the first time and a second time, and a second AOA measurement, taken by the UE at the second time, of RF signals received by the UE from a second base station. The method further comprises determining, by the location server, a location of the UE based, at least in part, on the information indicative of the first AOA measurement, the first sensor location information, and the second AOA measurement.

Alternative embodiments of the method may include one or more of the following features. Determining the location of the UE further may comprise assuming the UE, the first base station, and the second base station are on a common horizontal plane. Determining the location of the UE further may comprise, in response to assuming the UE, the first base station, and the second base station are on the common horizontal plane, calculating a two-dimensional location of the UE on the common horizontal plane. Determining the location of the UE further may comprise recalibrating the first location sensor information based on assuming the UE, the first base station and the second base station are on the common horizontal plane. The location information further may comprise information indicative of the first time, the second time, and one or more times at which measurements associated with the first sensor location information were taken by the UE. The information indicative of the first AOA measurement and the second AOA measurement may comprise a differential AOA (DAOA) measurement between the first base station and the second base station. The information indicative of the first AOA measurement and the second AOA measurement further may comprise information indicative of a measurement of a second angle between the first base station and the second base station, wherein the measurement of the second angle is independent of the DAOA measurement. The second angle may comprise an angle of elevation or an azimuth angle. The first sensor location information may comprise information regarding the UE including a velocity, acceleration, change in location, orientation, or change in orientation of the UE, or any combination thereof. The information indicative of the first AOA measurement and the second AOA measurement is based on a common orientation for the UE at the first time and at the second time. The UE may be at a first location at the first time and may be at a second location, different to the first location, at the second time. The location information further may comprise information indicative of a third AOA measurement of RF signals received by the UE from a third base station, obtained by the UE at a third time, and second sensor location information indicative of movement of the UE between the second time and the third time, where determining the location for the UE is further based at least in part on the information indicative of the third AOA measurement and the second sensor location information. Locations of the UE at the first time, the second time and the third time may all be different. The first base station may comprise a serving base station for the UE, and determining the location of the UE may comprise verifying that the first base station is not on a common plane for the UE, the second base station and the third base station, where the verifying is based at least in part on the information indicative of the first AOA measurement, the second AOA measurement and the third AOA measurement, and determining the location of the UE based on a location of the first base station. The location information further may comprise information indicative of one or more non-AOA and non-Differential AOA (DAOA) measurements of RF signals received by the UE from one or more base stations, the one or more non-AOA and non-DAOA measurements taken by the UE at one or more times, and the method further may comprise determining, by the location server, the location of the UE based, at least in part, on the information indicative of the first AOA measurement, the first sensor location information, the second AOA measurement, and the one or more non-AOA and non-DAOA measurements. The one or more non-AOA and non-DAOA measurements may comprise a Time Of Arrival (TOA) measurement, a Reference Signal Time Difference (RSTD) measurement, a Round Trip signal propagation Time (RTT) measurement, a Received Signal Strength Indicator (RSSI) measurement, a Reference Signal Received Power (RSRP) measurement, a Reference Signal Received Quality (RSRQ) measurement, or any combination thereof. The one or more base stations include the first base station, the second base station, or both base stations. The one or more times may include the first time, the second time, or both times.

An example UE, according to the disclosure, comprises a wireless communication interface, one or more inertial sensors, a memory, and a processing unit communicatively coupled with the wireless communication interface, the one or more inertial sensors, and the memory. The processing unit is configured to cause the UE to obtain, with the wireless communication interface at a first time, a first Angle Of Arrival (AOA) measurement of Radio Frequency (RF) signals received by the UE from a first base station, obtain, using the one or more inertial sensors, first sensor location information indicative of movement of the UE between the first time and a second time, and obtain, with the wireless communication interface at the second time, a second AOA measurement of RF signals received by the UE from a second base station. The processing unit is further configured to cause the UE to provide location information to a location determining entity, the location information comprising information indicative of the first AOA measurement, the first sensor location information, and the second AOA measurement.

Alternative embodiments of the UE may include one or more of the following features. The processing unit also may be configured to cause the UE to provide the location information at least in part by providing information indicative of the first time, the second time, and one or more times at which measurements associated with the first sensor location information were taken. The processing unit may be further configured to cause the UE to obtain a differential AOA (DAOA) measurement between the first base station and the second base station based on the first AOA measurement and the second AOA measurement, and include, in the location information, information indicative of the DAOA measurement. The processing unit may be further configured to cause the UE to obtain a measurement of a second angle between the first base station and the second base station based on the first AOA measurement and the second AOA measurement, where the measurement of the second angle is independent of the DAOA measurement, and include, in the location information, information indicative of the measurement of the second angle. The location determining entity may comprise a location server. The UE may comprise the location determining entity, and the processing unit may be further configured to cause the UE to determine a location for the UE based at least in part on the information indicative of the first AOA measurement, the first sensor location information, and the second AOA measurement. The first sensor location information may comprise information regarding the UE including a velocity, acceleration, change in location, orientation, or change in orientation of the UE, or any combination thereof. The processing unit may be further configured to cause the UE to adjust the first AOA measurement, the second AOA measurement or both AOA measurements based on a common orientation for the UE at the first time and at the second time, where the location information is based on the common orientation for the UE. The processing unit may be further configured to cause the UE to, when the UE is at a first location at the first time and at a second location, different to the first location, at the second time: obtain, with the wireless communication interface at a third time and at a third location, different to the first location and the second location, a third AOA measurement of RF signals received by the UE from a third base station, obtain, using the one or more inertial sensors, second sensor location information indicative of movement of the UE between the second time and the third time, and include, in the location information, information indicative of the third AOA measurement and the second sensor location information. The processing unit may be further configured to cause the UE to obtain, with the UE at one or more times, one or more non-AOA and non-Differential AOA (DAOA) measurements of RF signals received by the UE from one or more base stations, and include, in the location information, information indicative of the one or more non-AOA and non-DAOA measurements.

An example location server for determining a location of a UE, according to the disclosure, comprises a communication subsystem, a memory, and a processing unit communicatively coupled with the communication subsystem and the memory and configured to cause the location server to: receiving, using the communication subsystem, location information from the UE. The location information comprises information indicative of: a first Angle Of Arrival (AOA) measurement, taken by the UE at a first time, of Radio Frequency (RF) signals received by the UE from a first base station, first sensor location information measured by one or more inertial sensors of the UE, the first sensor location information indicative of movement of the UE between the first time and a second time, and a second AOA measurement, taken by the UE at the second time, of RF signals received by the UE from a second base station. The processing unit is configured to cause the location server to determine a location of the UE based, at least in part, on the information indicative of the first AOA measurement, the first sensor location information, and the second AOA measurement.

Alternative embodiments of the location server can include one or more of the following features. The processing unit may be configured to cause the location server to determine the location of the UE at least in part by assuming the UE, the first base station, and the second base station are on a common horizontal plane. The processing unit may be configured to cause the location server to determine the location of the UE at least in part by, in response to assuming the UE, the first base station, and the second base station are on the common horizontal plane, calculating a two-dimensional location of the UE on the common horizontal plane. The processing unit may be configured to cause the location server to determine the location of the UE at least in part by recalibrating the first location sensor information based on assuming the UE, the first base station and the second base station are on the common horizontal plane. The processing unit may be further configured to cause the location server to determine the location of the UE based, at least in part, on information regarding the UE including a velocity, acceleration, change in location, orientation, or change in orientation of the UE, or any combination thereof, included in the information indicative the first sensor location information. The processing unit may be further configured to cause the location server to determine the location for the UE further based at least in part on information indicative of a third AOA measurement and second sensor location information, where: the UE is at a first location at the first time and at a second location, different to the first location, at the second time, the third AOA measurement is of RF signals received by the UE from a third base station, obtained by the UE at a third time, and the second sensor location information indicative of movement of the UE between the second time and the third time. The first base station may comprise a serving base station for the UE, and the processing unit may be configured to cause the location server to determine the location of the UE at least in part by: verifying that the first base station is not on a common plane for the UE, the second base station and the third base station, where the verifying is based at least in part on the information indicative of the first AOA measurement, the second AOA measurement and the third AOA measurement, and determining the location of the UE based on a location of the first base station. The location information further may comprise information indicative of one or more non-AOA and non-Differential AOA (DAOA) measurements of RF signals received by the UE from one or more base stations, the one or more non-AOA and non-DAOA measurements taken by the UE at one or more times, and the processing unit may be further configured to cause the location server to determine the location of the UE based, at least in part, on the information indicative of the first AOA measurement, the first sensor location information, the second AOA measurement, and the one or more non-AOA and non-DAOA measurements.

BRIEF DESCRIPTION OF DRAWINGS

Non-limiting and non-exhaustive aspects are described with reference to the following figures, wherein like reference numerals refer to like parts and like elements throughout the various figures unless otherwise specified.

FIGS. 4-6 are illustrations of how AOA measurements may be obtained, according to some embodiments.

FIGS. 7A and 7B illustrate how a differential AOA (DAOA) may be used to locate a UE, according to an embodiment.

DETAILED DESCRIPTION

Figure 1:
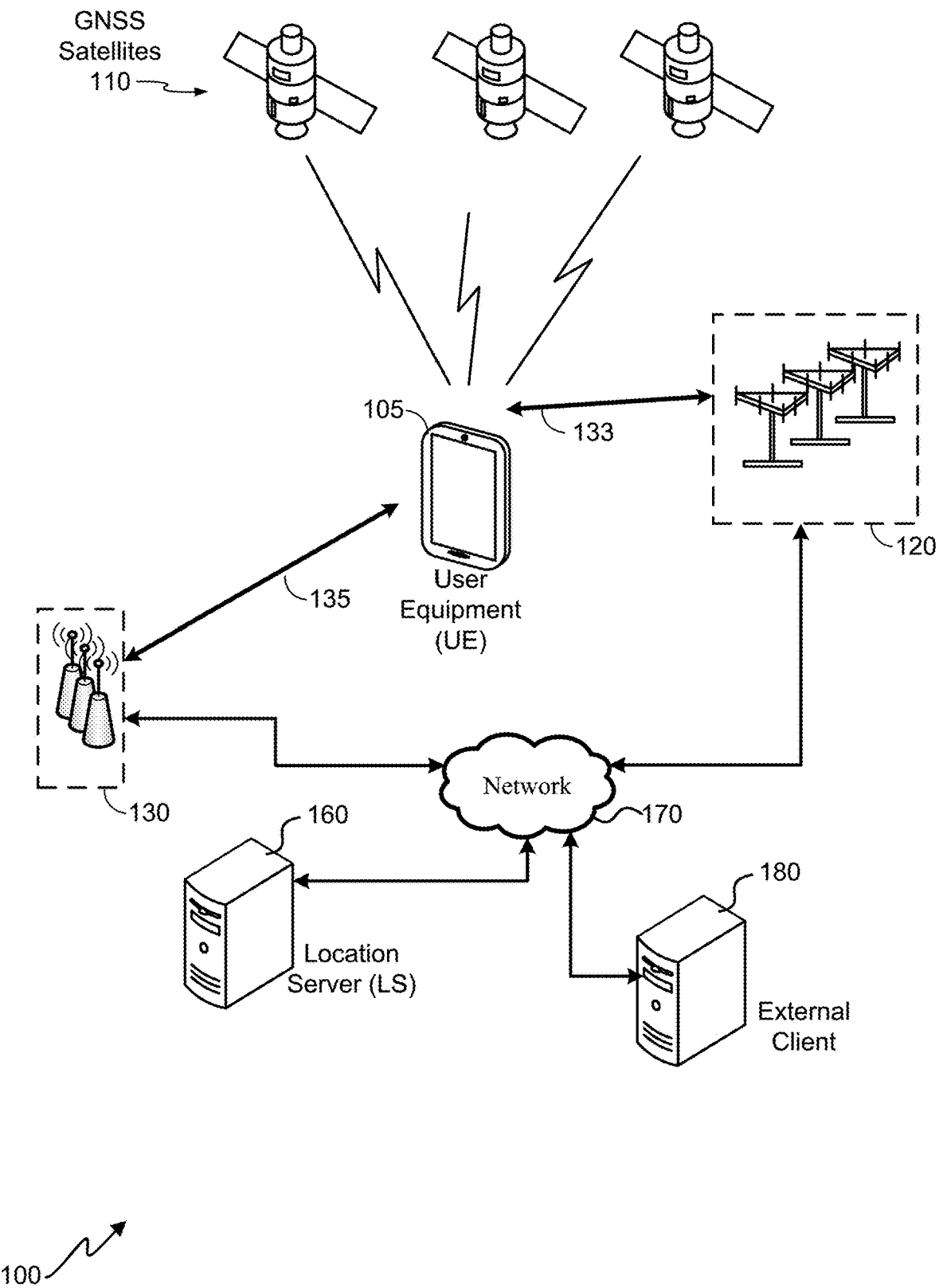
FIG. 1 is a simplified illustration of a communication system, according to an embodiment, that may use the techniques provided herein for improving the accuracy of an estimated location of a user equipment (UE).

Some example techniques are presented herein which may be implemented at a mobile device or mobile station (referred to herein as a user equipment, or "UE"), a location server (LS), and/or at other device(s) to provide increased accuracy of a position determination for a UE. These techniques can be utilized in a variety of applications utilizing various technologies and/or standards, including, the Long Term Evolution (LTE) Positioning Protocol (LPP) defined by the 3rd Generation Partnership Project (3GPP), the LPP Extensions (LPPe) protocol defined by the Open Mobile Alliance (OMA), a possible future New Radio (NR) Positioning Protocol (NPP or NRPP) to be defined by 3GPP for Fifth Generation (5G) positioning of a UE with NR radio access, and/or positioning for 802.11 Wi-Fi® defined by the Institute of Electrical and Electronics Engineers (IEEE).

A UE may comprise a mobile device such as, a mobile phone, smartphone, tablet or other mobile computer, a portable gaming device, a personal media player, a personal navigation device, a wearable device, an in-vehicle device, or other electronic device. Position determination of a UE may be useful to the UE and/or other entities in a wide variety of scenarios, e.g. such as for personal navigation, asset and person tracking, and in association with an emergency call. There are many methods already known to determine an estimated position of the UE, including methods that involve communicating measurement and/or other information between the UE and an LS. However, these position methods do not always include an indication of movement of the UE (e.g. a velocity of the UE), which may degrade the position determination in one or more different ways.

One way in which movement (e.g. velocity) of a UE may degrade a position determination for the UE is that location-related measurements obtained by or on behalf of the UE and used to determine a position of the UE may not be obtained for a single position of the UE. More specifically, a position determination may be based on multiple position measurements (e.g., of Observed Time Difference Of Arrival (OTDOA) Reference Signal Time Difference (RSTD), Global Navigation Satellite System (GNSS) code phase, GNSS pseudorange, Round Trip signal propagation Time (RTT), AOA etc.), which may be obtained during a period of time (e.g. 15 to 30 seconds in some scenarios), rather than all at the same time. For a moving UE, this can mean that different measurements may correspond with different locations of the UE. Thus, depending on the sequence of obtaining different measurements, the final location estimate may vary and may have an associated uncertainty or error.

In addition, even if it were possible to compensate for time effects in different measurements (e.g. by adjusting each measurement to a measurement that would have been obtained at a common time and for the same UE location), the location of the UE could still be in error due to the delay between the time the measurements were obtained or adjusted (e.g., at the adjusted common time) and the time the location estimate is determined. For example, for a UE moving in a straight line at 30 meters per second (67 mph), a 10-second delay in determining the location of the UE would result in a location determination that is in error by 300 meters (984 feet) at the time the location is determined. These types of inaccuracies can result in, among other things, poor performance by applications and/or other services that depend on an accurate location.

Techniques provided herein address these and other issues by employing sensors in a UE to obtain movement related information applicable to a time period when the UE is obtaining location measurements. The movement related information can then be used to improve the accuracy of a location derived from other position methods and/or an estimate of uncertainty or error in the resulting location, as determined by the UE and/or LS.

In one embodiment applicable to AOA and DAOA positioning, inertial sensors are used within a UE to track horizontal (and vertical) motion and change in angular UE orientation. It may then be possible to compute UE location using triangulation for AOA measurements relative to a global reference frame or using multilateration using differential AOA measurements without a global reference frame. The computation may be only slightly more complex than in the simpler case without UE motion. The UE can report the sensor measurements to a location server along with the AOA or DAOA measurements to allow the server to calculate the location—or the UE can perform the calculation itself if provided with base station coordinates by the location server or via broadcast. The UE can also make use of (e.g. report) AOA or DAOA measurements using 3D (e.g. spherical) angles to increase accuracy when the UE and base stations are not in the same horizontal plane—e.g. when a UE receives signals from base stations above and/or below UE floor level in a building or when some base stations are on hills or the UE is near a base station antenna tower. 3D angles can also be used to identify whether the UE may be close to a serving base station where there may be a high angle of elevation. In this case, just an AOA for the serving base station and an RTT estimate could accurately locate the UE.

FIG. 1 is a simplified illustration of a communication system 100 in which a user equipment (UE) 105, location server (LS) 160, and/or other components of the communication system 100 can use the techniques provided herein for improving the accuracy of an estimated location of UE 105, according to an embodiment. The techniques described herein may be implemented by one or more components of the communication system 100. The communication system 100 can include a UE 105, one or more satellites 110 for a GNSS (also referred to as GNSS space vehicles (SVs)), base stations 120, access points (APs) 130, LS 160, network 170, and external client 180.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger or smaller number of base stations 120 and/or APs 130 than illustrated in FIG. 1. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the $3^{rd}$ Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GCN) in the case that Network 170 is a 5G network. An AP 130 may comprise a Wi-Fi AP or a Bluetooth® AP. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with other devices (e.g. Internet-connected devices), including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g. data transported using the Internet Protocol (IP) and/or Transmission Control Protocol (TCP)) from the perspective of network 170.

An estimated location of UE 105 can be used in a variety of applications—e.g. to assist direction finding or navigation for a user of UE 105 or to assist another user (e.g. associated with external client 180) to locate UE 105. A "location" of UE 105 is also referred to herein as a "location estimate", "estimated location", "position", "position estimate", "position fix", "estimated position", "location fix" or "fix". A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (e.g. as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be, for example, a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

Techniques herein for improving location accuracy of UE 105 can be implemented in scenarios in which UE 105 provides location-related measurements to LS 160 for location determination. Location-related measurements obtained by UE 105 and provided to LS 160 can include measurements of RSTD, GNSS code phase, GNSS pseudorange, GNSS carrier phase, RTT, Reference Signal Received Power (RSRP), Reference Signal Received Quality (RSRQ), Angle of Arrival (AOA), Differential AOA (DAOA), etc. Location-related measurements may be referred to simply as "location measurements", "position measurements" or "measurements". The techniques described herein enable the UE to obtain movement related measurements (also referred to as "velocity-related measurements" or as "velocity measurements") during a period of time (also referred to as a "window of time") in which other location-related measurements may be being obtained by UE 105. UE 105 can then provide LS 160 with both the velocity-related measurements and the other location-related measurements, and LS 160 can then improve the accuracy of the location estimate of UE 105 (and/or an estimated error or level of accuracy thereof) by accounting for the movement, velocity and/or change in velocity of UE 105. It can be noted, however, that techniques provided herein can also be helpful in scenarios in which UE 105 remains stationary.

Figure 2:
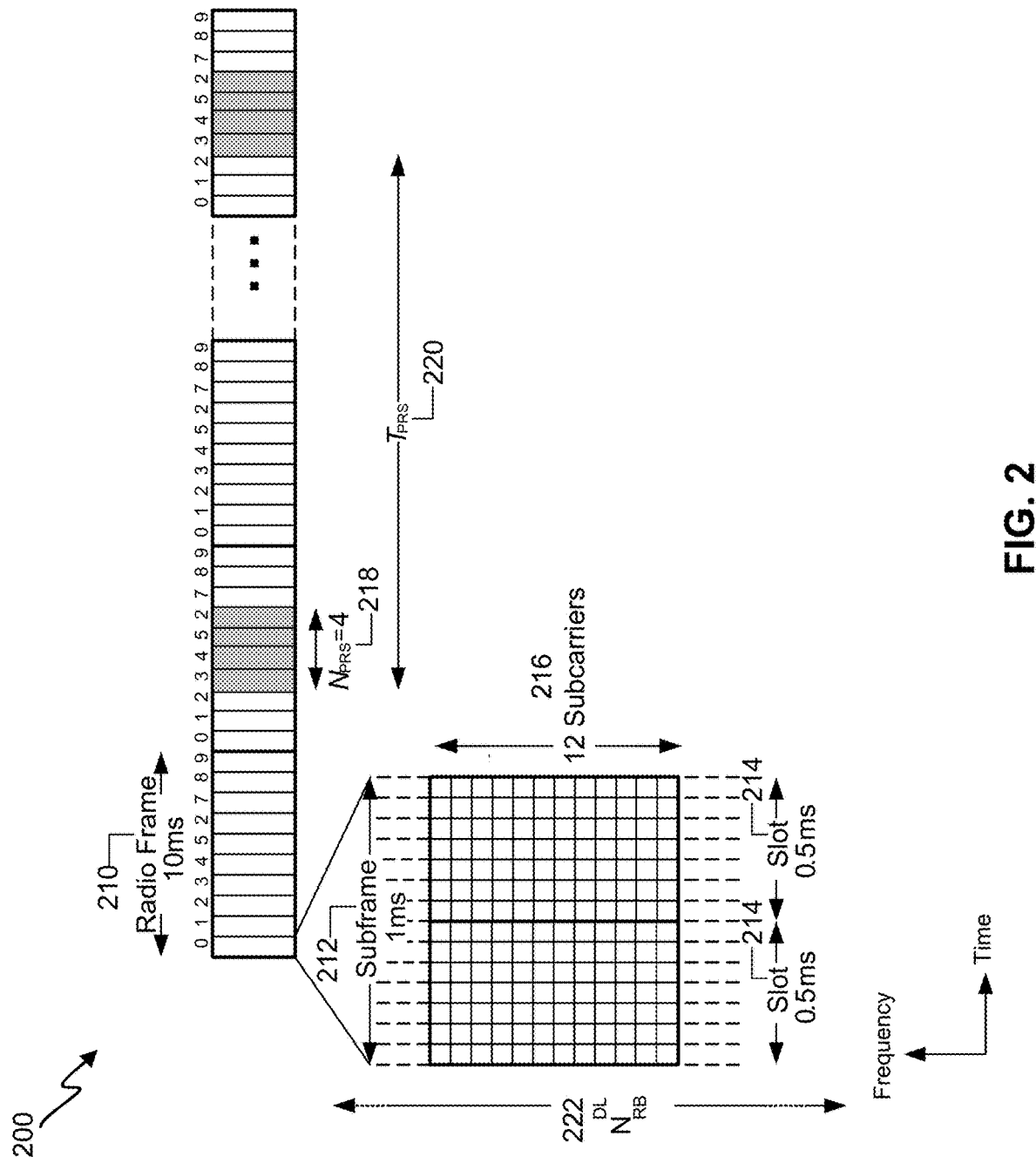
FIG. 2 is an illustration of a structure of an example Long-Term Evolution (LTE) subframe sequence with Positioning Reference Signal (PRS) positioning occasions.
Figure 3:
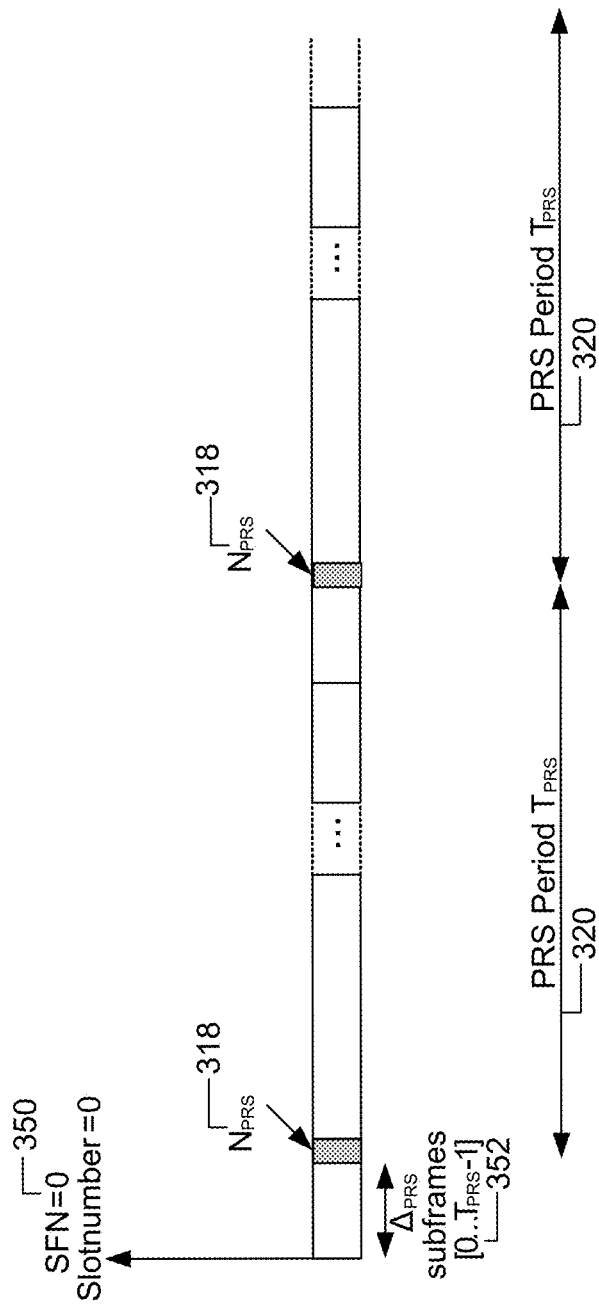
FIG. 3 illustrates further aspects of PRS transmission for a cell supported by a wireless node.

As previously noted, the location-related measurements taken by the UE 105 may be based on signals received from base stations 120. In LTE, these signals may include Positioning Reference Signals (PRSs), which are signals transmitted by base stations in an LTE network specifically for positioning. FIGS. 2-3 provide additional detail regarding PRSs and positioning in LTE. It can be further noted that it is expected that PRSs in 5G will be similar to those in LTE, and may therefore be similarly applicable to positioning techniques provided herein.

FIG. 2 shows a structure of an example LTE subframe sequence 200 with PRS positioning occasions. While FIG. 2 provides an example of a subframe sequence for LTE, similar subframe sequence implementations may be realized for other communication technologies/protocols, such as 5G and NR. In FIG. 2, time is represented horizontally (e.g., on an X axis) with time increasing from left to right, while frequency is represented vertically (e.g., on a Y axis) with frequency increasing (or decreasing) from bottom to top. As shown in FIG. 2, downlink and uplink LTE Radio Frames 210 may be of 10 milliseconds (ms) duration each. For downlink Frequency Division Duplex (FDD) mode, Radio Frames 210 are organized, in the illustrated embodiments, into ten subframes 212 of 1 ms duration each. Each subframe 212 comprises two slots 214, each of, for example, 0.5 ms duration.

In the frequency domain, the available bandwidth may be divided into uniformly spaced orthogonal subcarriers 216. For example, for a normal length cyclic prefix using, for example, 15 kHz spacing, subcarriers 216 may be grouped into a group of twelve (12) subcarriers. Each grouping, which comprises the 12 subcarriers 216, is termed a resource block and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{RB}^{DL}$. For example, for a 3 MHz channel bandwidth in the above example, the number of available resource blocks on each channel 222 is given by $N_{RB}^{DL}=15$.

In the communication system 100 illustrated in FIG. 1, a base station 120 (e.g., an eNB, ng-eNB, or gNB), may transmit frames, or other physical layer signaling sequences, supporting PRS signals (i.e. a downlink (DL) PRS) according to frame configurations similar to or the same as that shown in FIG. 2 and (as described later) in FIG. 3, which may be measured and used for UE (e.g., UE 105) position determination. As noted, other types of wireless nodes and base stations may also be configured to transmit PRS signals configured in a manner similar to that depicted in FIGS. 2 and 3. Since transmission of a PRS by a wireless node or base station is directed to all UEs within radio range, a wireless node or base station can also be considered to transmit (or broadcast) a PRS. Further, in some implementations, a directional PRS, which may comprise a PRS transmitted or "beamformed" in one particular direction or over a narrow range of horizontal and/or vertical angles, may have a frame configuration similar to or the same as that shown and described for FIGS. 2 and 3.

A PRS, which has been defined in 3GPP LTE Release-9 and later releases, may be transmitted by wireless nodes (e.g. eNBs) after appropriate configuration (e.g., by an Operations and Maintenance (O&M) server). A PRS may be transmitted in special positioning subframes that are grouped into positioning occasions. For example, in LTE, a PRS positioning occasion can comprise a number $N_{PRS}$ of consecutive positioning subframes where the number $N_{PRS}$ may be between 1 and 160 (e.g. may include the values 1, 2, 4 and 6 as well as other values). The PRS positioning occasions for a cell supported by a wireless node may occur periodically at fixed intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 2 illustrates a periodicity of positioning occasions where $N_{PRS}$ (218) equals 4 and $T_{PRS}$ (220) is greater than or equal to 20. In some embodiments, $T_{PRS}$ may be measured in terms of the number of subframes between the start of consecutive positioning occasions.

Within each positioning occasion, a PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g. at a constant power). Muting may aid signal acquisition and AOA, DAOA, Time of Arrival (TOA) and/or RSTD measurement by UEs (such as the UE 105 depicted in FIG. 1 and in embodiments described herein below), of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g. using LPP, NPP or NRPP) to a UE using bit strings. For example, in a bit string signaling a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of a PRS identity (ID) for a cell or Transmission Point (TP) (denoted as $N_{ID}^{PRS}$) or as a function of a Physical Cell Identifier (PCI) (denoted as $N_{ID}^{cell}$) if no PRS ID is assigned, which may result in an effective frequency re-use factor of 6 in the case of LTE.

To also improve hearability of a PRS (e.g., when PRS bandwidth is limited such as with only 6 resource blocks corresponding to 1.4 MHz bandwidth), the frequency band for consecutive PRS positioning occasions (or consecutive PRS subframes) may be changed in a known and predictable manner via frequency hopping. In addition, a cell supported by a wireless node may support more than one PRS configuration, where each PRS configuration may comprise a distinct frequency offset (vshift), a distinct carrier frequency, a distinct bandwidth, a distinct code sequence, a distinct muting pattern, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics such as a distinct direction of transmission, a distinct range of horizontal angles and/or a distinct range of vertical angles. Further enhancements of a PRS may also be supported by a wireless node.

In some embodiments, assistance data may be provided to a UE 105 by a location server (e.g., the LS 160 of FIG. 1) for a "reference cell" and one or more "neighbor cells" or "neighboring cells" relative to the "reference cell." For example, the assistance data may provide the center channel frequency of each cell, various PRS configuration parameters (e.g., $N_{PRS}$, $T_{PRS}$, muting sequence, frequency hopping sequence, PRS ID, PRS bandwidth), a cell global ID, PRS signal characteristics associated with a directional PRS, and/or other cell related parameters. The assistance data may assist or guide the UE 105 to obtain location-related measurements for terrestrial position methods such as OTDOA, AOA, DAOA, RTT or some other positioning method. For example, with OTDOA positioning, the UE 105 may measure an RSTD between the reference cell and each of one or more neighbor cells. Similarly, for DAOA, a UE 105 may measure an angular difference between the PRS transmission direction to (or from) the reference cell and each of one or more neighbor cells, e.g. as described later herein with reference to FIGS. 4-9B.

PRS-based positioning by a UE 105 (e.g. using OTDOA or DAOA) may be facilitated by indicating the serving cell for the UE 105 in the assistance data (e.g. with the reference cell indicated as being the serving cell). In the case of a UE 105 with 5G NR wireless access, the reference cell may be chosen by the LS 160 (e.g., an LMF) as some cell with good coverage at the expected approximate location of the UE 105 (e.g., as indicated by the known NR serving cell for the UE 105).

In some embodiments, assistance data for PRS may also include "expected measurement" parameters, which provide the UE 105 with information about the measurements values (e.g. of RSTD, DAOA or AOA) which the UE 105 is expected to measure at its current location between the reference cell and each neighbor cell, together with an uncertainty of the expected measurement. The expected measurement together with the associated uncertainty, may define a search window for the UE 105 within which the UE 105 is expected to obtain a measurement (e.g. of RSTD, DAOA or AOA). Assistance information for PRS may also include PRS configuration information parameters, which allow a UE 105 to determine when a PRS positioning occasion occurs on signals received from various neighbor cells relative to PRS positioning occasions for the reference cell, and to determine the PRS sequence transmitted from various cells in order to obtain a signal measurement (e.g. of AOA, DAOA, TOA or RSTD).

Using the measurements (e.g. of RSTD, AOA or DAOA), optionally the known absolute or relative transmission timing of each cell (e.g. in the case of RSTD measurements), and the known position(s) of wireless node physical transmitting antennas for the reference and neighboring cells, the UE 105's position may be calculated (e.g., by the UE 105, by the LS 160, or by some other node). For example, in the case of RSTD measurements, the RSTD for a cell "k" relative to a reference cell "Ref", may be given as ($TOA_k - TOA_{Ref}$). TOA measurements for different cells may then be converted to RSTD measurements (e.g. as defined in 3GPP Technical Specification (TS) 36.214 entitled "Physical layer; Measurements") and sent to the location server (e.g., the LS 160) by the UE 105. Using (i) the RSTD measurements, (ii) the known absolute or relative transmission timing of each cell, (iii) the known position(s) of physical transmitting antennas for the reference and neighboring cells, and/or (iv) directional PRS characteristics such as a direction of transmission, the UE 105's position may be determined. Similarly and as described in more detail later in association with FIGS. 4-9B, in the case of DAOA measurements, the DAOA for a cell "k" relative to a reference cell "Ref", may be given as ($AOA_k - AOA_{Ref}$) (or as ($AOA_k - AOA_{Ref}$) mod 360), where the AOA measurement provides a horizontal bearing (e.g. in degrees measured clockwise from an absolute direction such as true North or a locally determined horizontal direction) from the UE 105 to the antenna for the measured cell. AOA measurements for different cells may then be converted to DAOA measurements and sent to the location server (e.g., the LS 160) by the UE 105. Using (i) the DAOA measurements, (ii) the known position(s) of physical transmitting antennas for the reference and neighboring cells, and/or (iii) directional PRS characteristics such as a direction of transmission, the UE 105's position may be determined.

FIG. 3 illustrates further aspects of PRS transmission for a cell supported by a base station (e.g., an eNB or a gNB). Again, PRS transmission for LTE is assumed in FIG. 3 although the same or similar aspects of PRS transmission to those shown in and described for FIG. 3 may apply to 5G, NR and/or other wireless technologies. FIG. 3 shows how PRS positioning occasions are determined by a System Frame Number (SFN), a cell specific subframe offset ($\Delta_{PRS}$)) and the PRS Periodicity ($T_{PRS}$) 320. Typically, the cell specific PRS subframe configuration is defined by a "PRS Configuration Index" $I_{PRS}$ included in the PRS assistance data. The PRS Periodicity ($T_{PRS}$) 320 and the cell specific subframe offset ($\Delta_{PRS}$) are defined based on the PRS Configuration Index $I_{PRS}$, in 3GPP TS 36.211 entitled "Physical channels and modulation," as illustrated in Table 1 below.

TABLE 1

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |

TABLE 1-continued

| PRS configuration Index $I_{PRS}$ | PRS periodicity $T_{PRS}$ (subframes) | PRS subframe offset $\Delta_{PRS}$ (subframes) |
|---|---|---|
| 1120-2399 | 1280 | $I_{PRS}$-1120 |
| 2400-2404 | 5 | $I_{PRS}$- 2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS configuration is defined with reference to the System Frame Number (SFN) of a cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0 \quad \text{(Eq. 1)}$$

where $n_f$ is the SFN with $0 \le n_f \le 1023$, $n_s$ is the slot number within the radio frame defined by $n_f$ with $0 \le n_s \le 19$, $T_{PRS}$ is the PRS periodicity, and $\Delta_{PRS}$ is the cell-specific subframe offset.

As shown in FIG. 3, the cell specific subframe offset $\Delta_{PRS}$ 352 may be defined in terms of the number of subframes transmitted starting from System Frame Number 0 (Slot 'Number 0', marked as slot 350) to the start of the first (subsequent) PRS positioning occasion. In FIG. 3, the number of consecutive positioning subframes 318 ($N_{PRS}$) equals 4.

In some embodiments, when a UE 105 receives a PRS configuration index $I_{PRS}$ in the PRS assistance data for a particular cell, the UE 105 may determine the PRS periodicity $T_{PRS}$ and PRS subframe offset $\Delta_{PRS}$ using Table 1. The UE 105 may then determine the radio frame, subframe and slot when a PRS is scheduled in the cell (e.g., using Equation (1)). The PRS assistance data may be determined by, for example, the LS 160 and includes assistance data for a reference cell, and a number of neighbor cells supported by various wireless node.

Typically, PRS occasions from all cells in a network that use the same frequency are aligned in time and may have a fixed known time offset relative to other cells in the network that use a different frequency. In SFN-synchronous networks all wireless nodes (gNBs, eNBs, etc.) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time.

A UE 105 may determine the timing of the PRS occasions (e.g., in an LTE network or a 5G network such as that in communication system 100) of the reference and neighbor cells for positioning (e.g. OTDOA or DAOA positioning), if the UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

Positioning reference signals may be transmitted in special positioning subframes that are grouped into positioning occasions, as described previously. As defined by 3GPP (e.g., in TS 36.211), for LTE systems, the sequence of subframes used to transmit PRS (e.g., for OTDOA or DAOA positioning) may be characterized and defined by a number of parameters comprising: (i) a reserved block of bandwidth (BW), (ii) a configuration index $I_{PRS}$ (which defines both an offset $\Delta_{PRS}$ from the start of subframe zero for SFN zero to the first PRS positioning occasion and a periodicity $T_{PRS}$ in units of subframes for consecutive PRS positioning occasions), (iii) a duration $N_{PRS}$ (defining the number of consecutive PRS subframes in each PRS positioning occasion), (iv) an optional muting pattern (defining a sequence of consecutive PRS positioning occasions within which the PRS signal is either transmitted or is muted according to the muting pattern); and (v) a muting sequence periodicity $T_{REP}$ which can be implicitly included as part of the muting pattern in (iv) when present. In some cases, with a fairly low PRS duty cycle, $N_{PRS}$=1, $T_{PRS}$=160 subframes (equivalent to 160 ms), and BW=1.4, 3, 5, 10, 15 or 20 MHz. To increase the PRS duty cycle, the $N_{PRS}$ value can be increased to six (i.e., $N_{PRS}$=6) and the bandwidth (BW) value can be increased to the LTE system bandwidth (i.e., BW=LTE system bandwidth). An expanded PRS with a larger $N_{PRS}$ (e.g., greater than six) and/or a shorter $T_{PRS}$ (e.g., less than 160 ms), up to the full duty cycle (i.e., $N_{PRS}$=$T_{PRS}$), may also be used.

Figure 4:
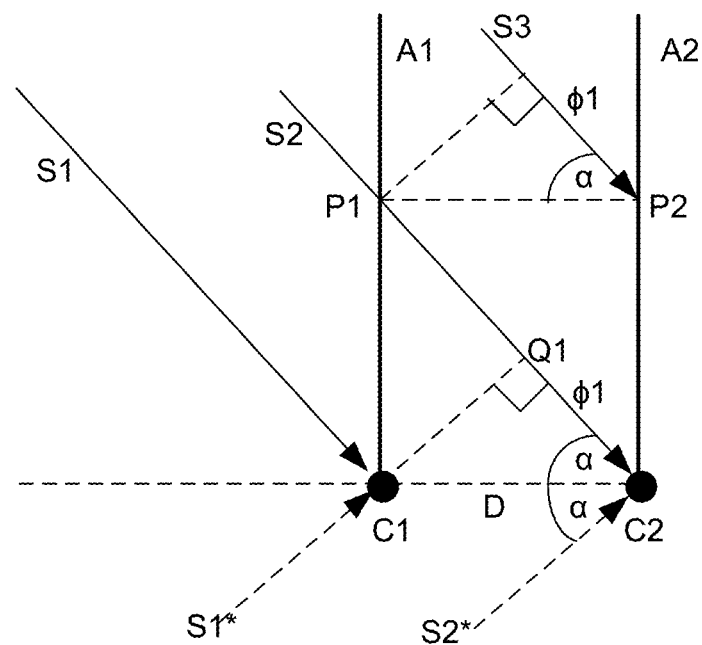

A UE 105 typically measures the AOA of an incoming signal (e.g. a PRS or other signal such as Tracking Reference Signal (TRS)) using multiple antenna elements and based on phase differences of the incoming signal at different antenna elements. FIG. 4 provides an illustration in the case of two parallel antenna monopoles A1 and A2 in a UE 105 spaced a distance D apart where D is less than the wavelength λ of the incoming signal, assumed in this example to propagate within the plane of the antennas A1 and A2. Signal S1 is received at the antenna connector C1 for antenna A1. A parallel signal S2 is received at the antenna connector C2 for antenna A2. Signals S1 and S2 are assumed to be coherent and to have been transmitted from a distant base station 120 making any difference in AOA negligible (hence allowing signals S1 and S2 to be treated as parallel). Due to coherence, the phase of signal S1 at connector C1 will be the same as the phase of signal S2 at point Q1 on the line of propagation of S2 where the line C1-Q1 is at right angles to the line C2-Q1. This will lead to a phase difference Φ1 ($0 \le \Phi 1 \le 2\pi$) of signal S2 at C2 relative to S1 at C1 where Φ1 is given by:

$$\Phi 1 = (D \cos \alpha)/\lambda \quad \text{(Eq. 2)}$$

where α=AOA of S1 and S2 relative to the line C1-C2.

The same phase difference Φ1 will occur at all other pairs of points along antennas A1 and A2 that are at the same distance from C1 and C2. For example, at the point P1 where signal S2 is received at antenna A1, another signal S3 will be received at antenna A2 at point P2 at the same distance from C2 as P1 is from C1 and with the same phase difference Φ1.

The consistency of the phase difference Φ1 will allow the UE 105 to measure the phase difference by comparing the two received signals on each antenna. Equation (2) then allows determination of the AOA α (using the known wavelength k and distance D).

However, the AOA is not uniquely determined because the same phase difference Φ1 would be measured by the UE 105 for other signals S1* and S2* that are mirror images of signals S1 and S2 with respect to the line C1-C2.

Figure 5:
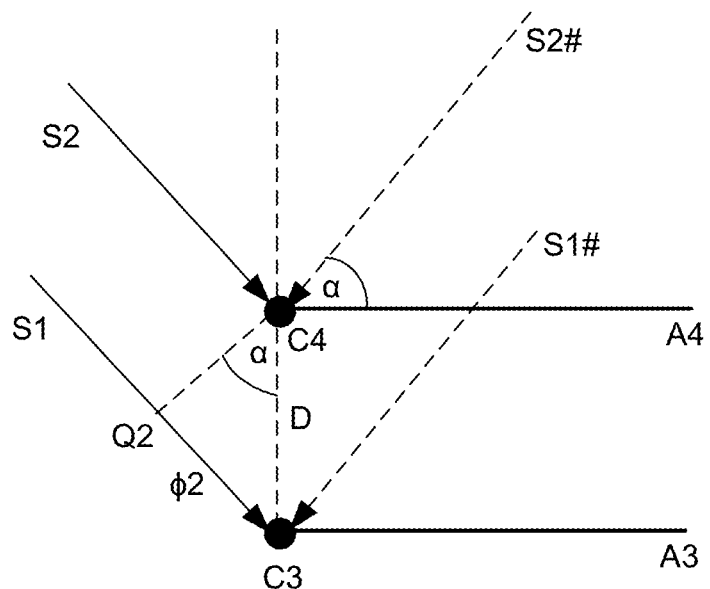

In order to determine whether the UE 105 is measuring signals S1 and S2 or signals S1* and S2* in FIG. 4, the UE 105 may use another pair of parallel monopole antennas A3 and A4 that are arranged perpendicular to A1 and A2 and in the same plane as shown in FIG. 5. (It can be noted that some embodiments may reduce the total number of antenna elements by sharing one or more antenna elements between pairs of antenna elements illustrated in FIGS. 4-6.) Antennas A3 and A4 can be used to measure a second phase difference Φ2 between signals S1 and S2 where Φ2 is given by:

$$\Phi 2 = (D \sin \alpha)/\lambda \quad (\text{Eq. 3})$$

In Equation (3), α would be the same AOA as in Equation (2). The second pair of signals for which antennas A3 and A4 would measure the same phase difference Φ2 are signals S1# and S2# which are mirror images of signals S1 and S2 with respect to the line C3-C4. Since the phase difference Φ1 in FIG. 4 and Φ2 in FIG. 5 are only both consistent with the AOA α for signals S1 and S2, the UE 105 would be able to uniquely determine the AOA.

For a signal (e.g. a PRS or TRS) whose propagation direction is not in the same plane as a pair of antennas being used to measure a phase difference for a UE 105, the direction of the signal would need to be expressed using a pair of angles such as an angle of azimuth in the antenna plane and either an angle of elevation above or below the antenna plane or a polar angle between the signal path and a perpendicular to the antenna plane. FIG. 6 shows an example for the pair of monopole antennas A1 and A2 from FIG. 4 for parallel signal paths S1 and S2 that subtend an angle of elevation θ with the antenna plane and whose projections S1* and S2* on the antenna plane have an angle of azimuth of a with respect to the line C1-C2. In FIG. 6, points P and P* are such that the line C1-P* is perpendicular to the projection S2* and the line P*-P is perpendicular to the signal path S2 and thus also perpendicular to a signal path parallel to S1 and S2 through the point P* (not shown in FIG. 6). As a result of both perpendiculars, signals S1 and S2 (assumed to be coherent) will have the same phase at the connector C1 and the point P, respectively. The phase difference Φ1 of the signal S2 at the connector C2 relative to the signal S1 at the connector C1 can then be determined from the length of the line P-C2 as a fraction of the wavelength λ which is:

$$\Phi 1 = (D \cos \alpha \cos \theta)/\lambda \quad (\text{Eq. 4})$$

An example analogous to FIG. 6 for the signals S1 and S2 in FIG. 6 received by the antennas A3 and A4 of FIG. 5 can be used to determine the phase difference Φ2 of the signal S1 at the connector C3 relative to the signal S2 at the connector C4 as:

$$\Phi 2 = (D \sin \alpha \cos \theta)/\lambda \quad (\text{Eq. 5})$$

giving:

$$\tan \alpha = \Phi 2/\Phi 1 \quad (\text{Eq. 6})$$

The angle of azimuth α can thus be obtained from the phase difference measurements Φ1 and Φ2 using Equation (6) and the angle of elevation θ can then be obtained using Equation (4) or Equation (5). However, there would still be an ambiguity as in the case of the planar signals S2 and S2 in FIG. 4, since a pair of signals that were mirror images of signals S1 and S2 with respect to the antenna plane (with the same angle of azimuth α and an angle of elevation of -θ) would also create phase differences at the antennas A1, A2, A3 and A4 satisfying Equations (4) and (5). To resolve this ambiguity, a third pair of parallel antennas could be used by the UE 105 to measure a third phase difference with the line joining their two connectors being perpendicular to the antenna plane in FIG. 6.

When the distance D equals or exceeds the wavelength λ of the incoming signal in FIGS. 4-6, Equations (2) to (5) need to be replaced by Equations (7) to (10) where the modulus (mod) operation is applied to real numbers.

$$\Phi 1 = ((D \cos \alpha)/\lambda) \bmod 2\pi \quad (\text{Eq. 7})$$

$$\Phi 2 = ((D \sin \alpha)/\lambda) \bmod 2\pi \quad (\text{Eq. 8})$$

$$\Phi 1 = ((D \cos \alpha \cos \theta)/\lambda) \bmod 2\pi \quad (\text{Eq. 9})$$

$$\Phi 2 = ((D \sin \alpha \cos \theta)/\lambda) \bmod 2\pi \quad (\text{Eq. 10})$$

Depending on how much D exceeds λ, there may be several (or many) angles α and θ satisfying these equations. To resolve this ambiguity, additional antennas could be used to obtain additional phase difference values. However, a simpler solution may be to ensure that (D<λ) always applies. For almost all wireless communication networks, carrier frequency may lie in the range 400 MHz to 60 GHz, whose corresponding wavelength λ is 75 centimeters (cms) down to 0.5 cms. An antenna spacing of 0.5 cms or less would thus ensure (D<λ) and for longer wavelength (e.g. for sub 6 GHz), larger spacing (e.g. up to 5 cms) is possible. This type of spacing may be entirely compatible with a typical physical size of wireless devices such as cellphones, smartphones, tracking devices etc.

It is noted that while FIGS. 4-6 provide illustrations of AOA measurement using monopole antennas, many other types of antenna may be used to measure AOA including, for example, dipoles, dipole arrays, phased arrays, fractals, MIMO (Multiple Input Multiple Output) arrays, etc., as is well known in the art.

When a UE 105 is able to measure the AOA to two separate base stations 120 relative to a global reference frame such as that defined by geographic North-South-East-West and up and down, the location of the UE 105 can be obtained by triangulation. However, this may require the UE 105 to be able to determine its orientation relative to the global reference system which may not always be possible.

When a UE 105 is unable to determine AOAs relative to a global reference frame, the location of the UE 105 may still be obtained from AOAs measured as described above to multiple base stations 120 using the angle between the pairs of base stations 120 at the location of the UE 105. An angle between a pair of base stations 120 as seen by a UE 105 is referred to herein as a "differential angle of arrival" (DAOA) and would be obtained from the AOAs for each of the two base stations 120. For example, when the AOAs to a pair of base stations 120 are each expressed (e.g. calculated) relative to some known fixed direction lying in the same plane PL as the directions to the two base stations 120 from the UE 105, the difference between the AOAs can be obtained to provide the DAOA. For example, the known fixed direction might be (i) some direction in an internal reference frame for the UE 105, (ii) the intersection of the plane PL with the horizontal plane (at the location of UE 105) when the plane PL is not horizontal, or (iii) a known geographic direction (e.g. geographic North) when the plane PL is horizontal.

FIG. 7A illustrates how a DAOA may be used to locate a UE 105. In FIG. 7A, it is assumed that a UE 105 has measured a DAOA equal to δ between a pair of base stations 120 labelled in FIG. 7A as A and B. This is enough to locate the UE 105 horizontally on some point P on an arc of a circle C above (or below) the chord AB where the angle APB equals δ. (It is noted that in FIG. 7A and subsequent figures, labels comprising a "P", represent virtual or physical geographic locations, which is different than labels comprising a "P" in FIGS. 4-6.) This follows from the constancy of the angle inscribed by the chord of a circle anywhere on the circle. FIG. 7A shows how the arc of a circle C can be determined using a perpendicular to the line AB through the midpoint M of the line AB. The point O on this perpendicular where the angle AOM is δ will be the center of the circle corresponding to the arc C. Since the central angle AOB will be 2δ, the inscribed angle APB will be δ from the well-known geometric theorem relating a central angle to an inscribed angle. The UE 105 will then be located on the arc C above the chord AB or the arc C* for the mirror image of C below the chord AB. (For example, and in detail, to obtain C and C*, the UE 105 or an LS 160 can obtain the distance OM as equal to the known distance AM divided by (tan δ) which may then locate the point O from which the arc of a circle C is defined from the radius OA and OB.)

If the UE 105 also determines a DAOA for another pair of base stations 120, the location of the UE 105 may be obtained from the intersection point of the arcs C and C* obtained for the first pair of base stations 120 and another similar pair of arcs of circles obtained for the second pair of base stations 120. In some cases, to resolve ambiguity when there are two or more points of undersection, a DAOA may be needed for a third pair of base stations 120.

If the location of the UE 105 is needed in three dimensions, the arc C in FIG. 7A can be rotated (through 360 degrees) around the AB line axis in FIG. 7A to create a two dimensional surface. The line AB will then subtend the same angle δ at any point on this surface meaning the UE 105 can be located anywhere on this surface. DAOAs obtained for two or three further pairs of base stations 120 can then be used to locate the UE 105 on other similar surfaces whose common intersection point can provide the exact UE 105 location in three dimensions.

FIG. 7B illustrates how the arc of a circle C shown in FIG. 7A may be determined (e.g. at a location server (LS) 160) in the case that the DAOA δ is greater than 90 degrees. The points A, B, M, O and P in FIG. 7B correspond to and have the same meaning as the points A, B, M, O and P in FIG. 7A. For clarity, an arc C* corresponding to C* in FIG. 7A is not shown in FIG. 7B, but if present would be a mirror image of the arc C with respect to the line AB.

In some scenarios, a UE 105 may provide one or more DAOA measurements and one or more other types of location measurement. In this case, an LS 160 may determine a location for the UE 105 using the DAOA measurement(s) as described for FIGS. 7A and 7B and the other measurements using combined or "hybrid" positioning. In the case of a UE 105 obtaining a DAOA measurement for a pair of base stations 120 (e.g. the base stations A and B in FIGS. 7A and 7B) and an observed time difference of arrival (OTDOA) RSTD measurement for the same pair of base stations 120, the location of the UE 105 may be given by the intersection of the arc of a circle C or C* in FIG. 7A (or FIG. 7B) with a hyperbola defined by the locations of the base stations A and B and the OTDOA RSTD measurement. In this case, it may be possible to determine a horizontal location of the UE 105 using a DAOA measurement and an OTDOA measurement for just one pair of base stations 120.

In order to report measurements of AOA and DAOA to a location server (LS) 160, a UE 105 may employ one of several techniques. In a first technique, a UE 105 may report each AOA relative to some fixed reference frame which may be local to the UE 105 (e.g. may be aligned with antennas or antenna connectors in the UE 105) or may be a global frame if the UE 105 is able to determine its absolute orientation. In this technique, the UE 105 may report angles using angles of azimuth and elevation (e.g. as shown by the angles α and θ in FIG. 6) or using polar angles. In the case of a local reference frame within UE 105, one particular plane may be selected to represent the horizontal plane to enable a definition of "azimuth" and "elevation", although this plane may not align with a true horizontal plane. In a second technique, a UE 105 may report the DAOA between pairs of base stations 120. For example, one base station 120 (or one cell) may serve as a reference base station (or reference cell) and the UE 105 reports a DAOA between this reference base station (or reference cell) and each of one or more neighbor base stations 120 (or neighbor cells). For example, each DAOA may correspond to the angle δ in FIGS. 7A and 7B. A problem with this technique is that information on the relative 3D locations of base stations 120 may be lost by only providing one angle for each base station 120. To provide the missing information, in a third technique, a UE 105 may report both a DAOA and a second angle.

Figure 8:
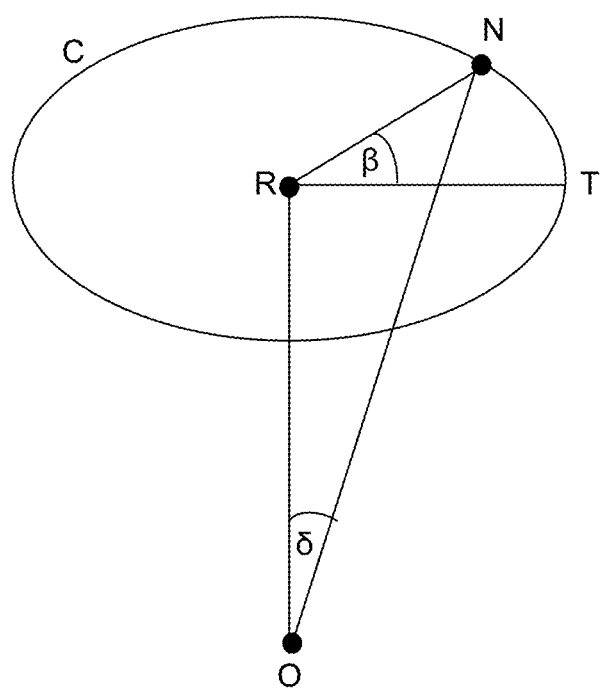
FIG. 8 illustrates a technique for reporting AOA measurements, according to an embodiment.

The third technique is illustrated in FIG. 8 when DAOAs are reported by a UE 105 which is at a location O relative to a common reference base station R. For any neighbor base station N, the UE 105 reports the DAOA δ and a second angle β. The second angle β may be independent of the DAOA δ and may provide additional information concerning the 3D location of a neighbor base station 120 relative to the reference base station 120 and the UE 105. The DAOA δ by itself may locate the neighbor base station N relative to the reference base station R on the surface of a cone with apex O, axis OR and apex angle 2δ. For any circular conic section C (as shown in FIG. 8), the UE 105 can report the angle of elevation β for the neighbor base station N above or below the intersection at a point T of some (e.g. arbitrary) reference plane for the UE 105 and the circle C, as shown in FIG. 8. The reference plane may be some fixed absolute plane (e.g. the horizontal plane) if UE 105 can determine its absolute orientation or may be some fixed (or temporarily fixed) reference plane local to the UE 105.

In an embodiment of the third technique, the UE 105 may use angles for a spherical coordinate system to report the angles δ and β exemplified in FIG. 8, where the UE 105 location O in FIG. 8 serves as the origin for the spherical coordinate system, the line OR serves as the Z-axis or zenith direction for the spherical coordinate system and the line RT provides a direction for a parallel X-axis (not shown in FIG. 8) through the UE 105 at the origin O for the spherical coordinate system. In such a spherical coordinate system, the angle δ may be the polar angle and the angle β may be the azimuth angle. The embodiment may not change the angles δ and β in FIG. 8 or how they are reported but may provide a more precise way of defining the angles. Therefore, in reporting an angle that is a DAOA (e.g. the angle δ in FIG. 7), a UE 105 may also measure and report an azimuth angle or an angle of elevation (e.g. the angle β in FIG. 8).

An LS 160 may use the additional AOA information provided using the first or third techniques to determine whether the measured base stations 120 are all approximately located in a common two-dimensional plane. This may be the case when a UE 105 is at or near ground level and the measured base stations 120 are located on or slightly above ground level. This scenario may be assumed by an LS 160 when AOAs measured by a UE 105 indicate directions to the measured base stations 120 that are all approximately in the same two-dimensional plane. When this scenario applies (or is assumed), an LS 160 may determine a UE 105 location horizontally in two dimensions which may simplify the location determination. In contrast, when a UE 105 is in a building (e.g. tall building with many floor levels) or is very close to the antenna tower of a base station 120, some measured base stations 120 (or the antennas for some measured base stations 120) may be above or below the UE 105. This scenario may be assumed by an LS 160 when AOAs measured by a UE 105 indicate directions to the measured base stations 120 that are not all approximately in the same two-dimensional plane. When this scenario applies (or is assumed), an LS 160 may determine a UE 105 location in three dimensions which may be more complex. Alternatively, if the directions to a first set of measured base stations 120 are all approximately in the same two dimensional plane, the LS 160 may ignore AOA measurements for base stations 120 in a second set whose directions are not in this two dimensional plane and may obtain the UE 105 location horizontally in two dimensions using only the AOAs of DAOAs for the first set of base stations 120. As another alternative, if a measured AOA to the serving base station 120 for the UE 105 is not in the same two dimensional plane as the AOAs to most of the other measured base stations 120, an LS 160 may assume that the UE 105 is close to the serving base station 120 and that an elevation of an antenna for the serving base station 120 is the cause of the AOA not being in the same plane as the other AOAs. In this case, the LS 160 may determine the UE 105 location using measurements only for the serving base station 120 (e.g. such as the AOA and an RTT).

In the event that the UE 105 is moving while obtaining AOA measurements for two or more base stations 120, the UE 105 may provide information, referred to here as "sensor location information" or as "location sensor information", to an LS 160 concerning changes in the location of the UE 105 and changes to the orientation of the UE 105. The location sensor information may be obtained by the UE 105 using inertial sensors and/or other sensors that are part of, attached to or otherwise accessible to the UE 105. For example, the location sensor information could comprise one or more of a velocity of the UE 105, an acceleration of the UE 105, a change in location of the UE 105 (e.g. relative to a previous location for the UE 105), a change in orientation of the UE 105 (e.g. relative to a previous orientation of the UE 105), an absolute orientation of the UE 105, and/or a time at which the UE 105 obtains one or more of these measurements. The UE 105 may further report the time as which the UE 105 obtains each AOA or DAOA measurement. Each reported time measurement may be an absolute time like Coordinated Universal Time (UTC) or a time relative to some local time such as the time when the UE 105 is about to send the measurements to the LS 160 or first starts obtaining the measurements.

An LS 160 may then use the location sensor information to compensate for the changes in UE 105 location and/or UE 105 orientation when determining the location of the UE 105 using the reported AOA measurements. In some cases, information on the orientation of the UE 105 may be inferred from AOA measurements by assuming that an AOA will always be approximately in a horizontal plane. This assumption may be used to partially recalibrate or verify an internal orientation of the UE 105 reported by the UE 105 as part of location sensor measurements. For example, the assumption may normally be valid for an AOA for a base station 120 that is inferred from other information (e.g. signal strength) to be distant from the UE 105. Use of this assumption may improve the accuracy with which changes in the orientation of a UE 105 are obtained. For example, if AOA or DAOA measurements are reported relative to a local internal reference frame for the UE 105 (e.g. as described in association with FIG. 8), the orientation of the internal reference frame and thus of the UE 105 may be inferred by assuming the direction from the UE 105 to each measured base station 120 (e.g. as represented by the lines OR and ON in FIG. 8) lie in a horizontal plane.

In order to simplify the reporting to an LS 160, the UE 105 may adjust reported AOA measurements to correspond to just one reference orientation of the UE 105 by adjusting any AOA to correspond to an AOA which the UE 105 would have measured with the reference orientation. With this technique, the UE 105 may need to measure changes in its orientation in order to adjust a measured AOA for a current orientation of UE 105 to an AOA which would have been measured by the UE 105 for the (different) reference orientation. In the case of a DAOA measurement for a pair of base stations 120, the UE 105 may adjust both AOA measurements for both base stations 120 to a common reference orientation for the UE 105 before calculating a DAOA from the pair of AOAs or may adjust one AOA measurement for one of the base stations 120 to an AOA measurement which would have been measured by the UE 105 using the orientation applicable to the AOA measurement for the other base station 120 and may then use the two AOA measurements to calculate a DAOA.

Figure 9A:
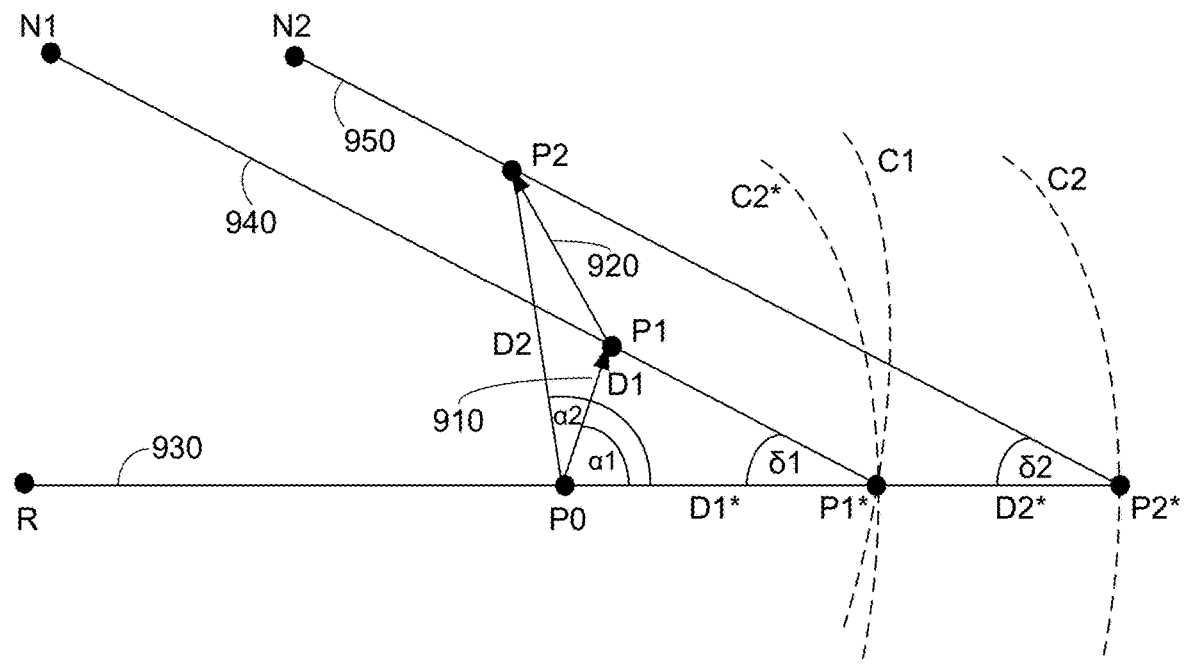
FIGS. 9A and 9B illustrate techniques of position determination using AOA and sensor measurements, according to an embodiment.

Such adjustment may not be sufficient to enable location of UE 105 in the case of horizontal or vertical movement of the UE 105 during AOA measurements (e.g. as opposed to changes in UE 105 orientation during AOA measurements without any horizontal or vertical movement). To compensate for this case, an LS 160 may use the location sensor information provided by a UE 105 and DAOA measurements to compute a UE 105 location as shown in FIG. 9A. In FIG. 9A, it is assumed that a UE 105 and base stations R (a reference base station), N1 and N2 (which may be examples of base stations 120 in FIG. 1) lie in the same horizontal plane. The UE 105 initially measures an AOA to the reference base station R along the straight line 930 when at position P0 (as shown in FIG. 9A). Subsequently, the UE 105 moves from position P0 to position P1 (in the same horizontal plane), as shown by the vector 910 in FIG. 9A, and measures an AOA at position P1 for a neighbor base station N1 along the straight line 940. It is noted that the vector 910 (and other vectors described later herein such as 920 and 960) may represent just a location of a subsequent position of UE 105 (e.g. P1) relative to an earlier position of UE 105 (e.g. P0) and not the exact trajectory of UE 105 in moving from the earlier position to the subsequent position, which in some examples may not be a straight line. Using the AOA measurement obtained for base station R at position P0 and the AOA measurement obtained for base station N1 at position P1, the UE 105 (or an LS 160) determines a DAOA measurement δ1 between base stations R and N1. This determination is assumed to ignore the change in position of the UE 105. Subsequently, the UE 105 moves from position P1 to position P2 (in the same horizontal plane), as shown by the vector 920 in FIG. 9A, and measures an AOA at position P2 for a neighbor base station N2 along the straight line 950. Using the AOA measurement obtained for base station R at position P0 and the AOA measurement obtained for base station N2 at position P2, the UE 105 (or an LS 160) determines a DAOA measurement δ2 between base stations R and N2. This determination is also assumed to ignore the change in position of the UE 105.

In FIG. 9A, the UE 105 is also assumed to measure the relative change in position and, in one embodiment, to provide the LS 160 with information enabling the LS 160 to determine the distances D1 and D2 of positions P1 and P2, respectively, from position P0 and the angles α1 and α2 of the lines P0-P1 and P0-P2, respectively, with the line P0-R. For example, the UE 105 may provide these quantities directly or may provide location sensor information (as described previously) enabling the LS 160 to calculate these quantities.

The DAOA δ1 in FIG. 9A represents the angle between the straight lines 930 and 940 and is thus the angle R-P1*-N1 in FIG. 9A where P1* is the point where the lines P0-R and P1-N1 intersect when suitably extended. Similarly, the DAOA δ2 in FIG. 9A represents the angle between the straight lines 930 and 950 and is thus the angle R-P2*-N2 in FIG. 9A where P2* is the point where the straight lines 930 and 950 intersect when suitably extended. Based on knowledge of the distances D1 and D2, the angles α1 and α2 and the angles δ1 and δ2, the LS 160 (or UE 105) may determine the distances D1* and D2* from position P0 to points P1* and P2*, respectively.

Using the method described for FIGS. 7A and 7B, the LS 160 (or UE 105) may determine an arc of a circle C1 passing through the point P1* based on the DAOA δ1 and the known locations of the base stations R and N1. Similarly, using the method described for FIGS. 7A and 7B, the LS 160 (or UE 105) may determine an arc of a circle C2 passing through the point P2* based on the DAOA δ2 and the known locations of the base stations R and N2. The LS 160 (or UE 105) may then determine an arc of a circle C2* that corresponds to the arc C2 when translated in the direction P2* to R by a distance D2*-D1*. The arc C2* will also pass through the point P1*. Therefore, the point P1* will be located at the intersection of the arcs C1 and C2* which may thereby allow the LS 160 (or UE 105) to determine the location of the point P1* which in turn may enable the locations of one or more of the points P0, P1 and P2 to be obtained (from the known distances D1*, D1 and D2 and the known angles α1 and α2). The LS 160 (or UE 105) may also translate the circular arcs C1 and C2 in other ways to both pass through any of the points P0, P1 and P2 and thereby determine the locations of any of these points from the intersections of the two translated arcs.

The method as just described may apply to locating the UE 105 in two dimensions (e.g. horizontally). When the positions P0, P1 and P2 of UE 105, the locations of the base stations R, N1 and N2 and the straight lines 930, 940 and 950 in FIG. 9A do not all lie in the same horizontal plane, the UE 105 may determine an AOA to each base station R1, N1 and N2 (when at positions P0, P1 and P2, respectively) that is horizontal (e.g. that excludes any angle of elevation). In this case, the DAOA angles δ1 and δ2 may also be determined in a horizontal plane and the location of the UE 105 may be determined horizontally, as just described, if UE 105 is also able to determine horizontal components of the vectors 910 and 920. In one embodiment, the UE 105 or LS 160 may determine the DAOA angles δ1 and δ2 and the vectors 910 and 920 by assuming that the positions P0, P1 and P2 of UE 105 and the base stations R, N1 and N2 in FIG. 9A all lie in the same horizontal plane (e.g. even when they may not), which may simplify the determination (e.g. since separate horizontal components of AOA and the vectors 910 and 920 may not need to be determined), though this may add some error into the determination of a location for UE 105.

Figure 9B:
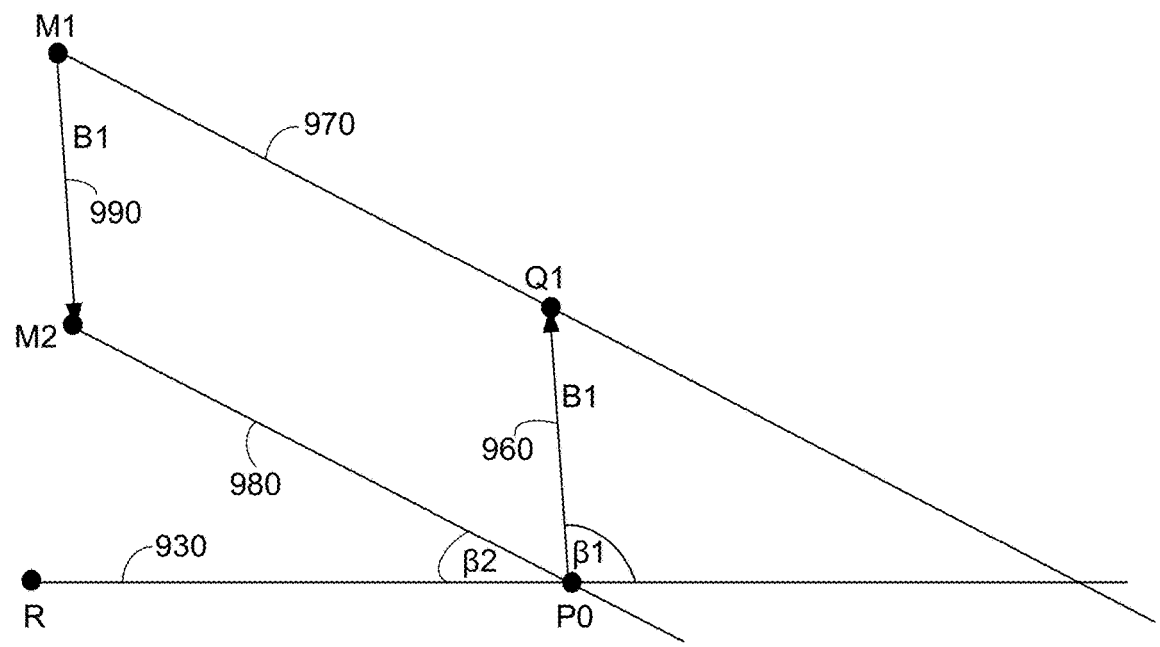

FIG. 9B exemplifies a technique which may be used to locate a UE 105 in three dimensions when the assumptions for FIG. 9A regarding UE 105 positions and locations of measured base stations all lying in a common horizontal plane do not necessarily apply. In FIG. 9B, the UE 105 is again assumed to start at a position P0 and to measure an AOA to a reference base station R when at the position P0 along the same straight line 930 as for FIG. 9A. The UE 105 then moves to a new position Q1 along the vector 960 and measures an AOA to a second base station M1 along the straight line 970. It is assumed that the positions P0 and Q1 and the locations of the base stations R and M1 may not all lie in the same horizontal plane. As a consequence, the straight line 970 passing through the base station M1 and position Q1 may not intersect with the straight line 930 through the base station R and position P0. However, unless the straight lines 930 and 970 are parallel, there will be a single straight line parallel to the straight line 970 which intersects with the straight line 930 at every point on the straight line 930. Accordingly, the UE 105 or the LS 160 can determine a straight line 980 parallel to the straight line 970 which passes through the initial position P0.

As an example of determining the straight line 980, a local XYZ coordinate system may be used aligned with absolute geographic directions (e.g. North-South-East-West and up-down and with the position P0 possibly at the origin). The UE 105 or the LS 160 can then determine the coordinates of the position Q1 based on the length of the vector 960 (e.g. a distance B1 traveled from position P0 to position Q1) and a direction for the vector 960 (e.g. which may comprise angles of azimuth and elevation in the local XYZ coordinate system, as illustrated by angle β1 in FIG. 9B which may be an angle of azimuth). The distance B1 and direction of the vector 960 may be obtained by the UE 105 using inertial sensors for the UE 105. The UE 105 or LS 160 can then determine a location M2 which would result from a movement along the inverse 990 of the vector 960 from the location of the base station M1. The inverse 990 of the vector 960 would have equal length B1 and an opposite direction. The straight line 980 parallel to the straight line 970 will then be given by the straight line which passes through the location M2 and the position P0, as a simple geometric consequence. Importantly (and assuming Line of Sight signal travel), the AOA for a fictitious base station at the location M2 measured by the UE at the position P0 will be the same as the AOA for the base station M1 measured by the UE 105 at the position Q1 as a consequence of the straight line 980 being parallel to the straight line 970. If the UE 105 was able to determine the AOA to the base station R at position P0 and the AOA to the base station M1 at position Q1 as absolute AOAs relative to absolute directions (e.g. North-South-East-West and up-down), the UE 105 or LS 160 can then determine the directions of the lines 980 and 930 absolutely and determine the position P0 from their intersection. If the UE 105 was only able to determine the AOAs relative to some common reference frame internal to the UE, the UE 105 or the LS 160 may instead use the AOAs to determine a DAOA, shown as the angle β2 in FIG. 9B, between the base station R and the fictitious base station at the location M2. In determining the DAOA, the UE 105 may need to adjust for any change in UE orientation between measuring the AOAs at the positions P0 and Q1. The UE 105 or LS 160 can then determine an arc of a circle or the rotation of an arc of a circle, from the location of the base station R, the location M2 and the DAOA, which passes through the position P0 as described previously for FIGS. 7A and 7B. The UE 105 may then obtain an additional AOA measurement for each of one or more additional base stations at each of one or more corresponding additional positions of the UE 105, and may obtain additional location information for each of these additional positions using inertial sensors of UE 105 (e.g. to enable the UE 105 or LS 160 to determine a vector along which UE 105 moves to each new additional position). The UE 105 or LS 160 may then repeat the process just described for the base station M1 in FIG. 9B for each of the additional base stations to obtain additional arcs of circles or rotations of arcs of circles passing through the position P0 and may determine the position P0 from a common intersection point of the arcs or rotations of arcs.

Figure 10:
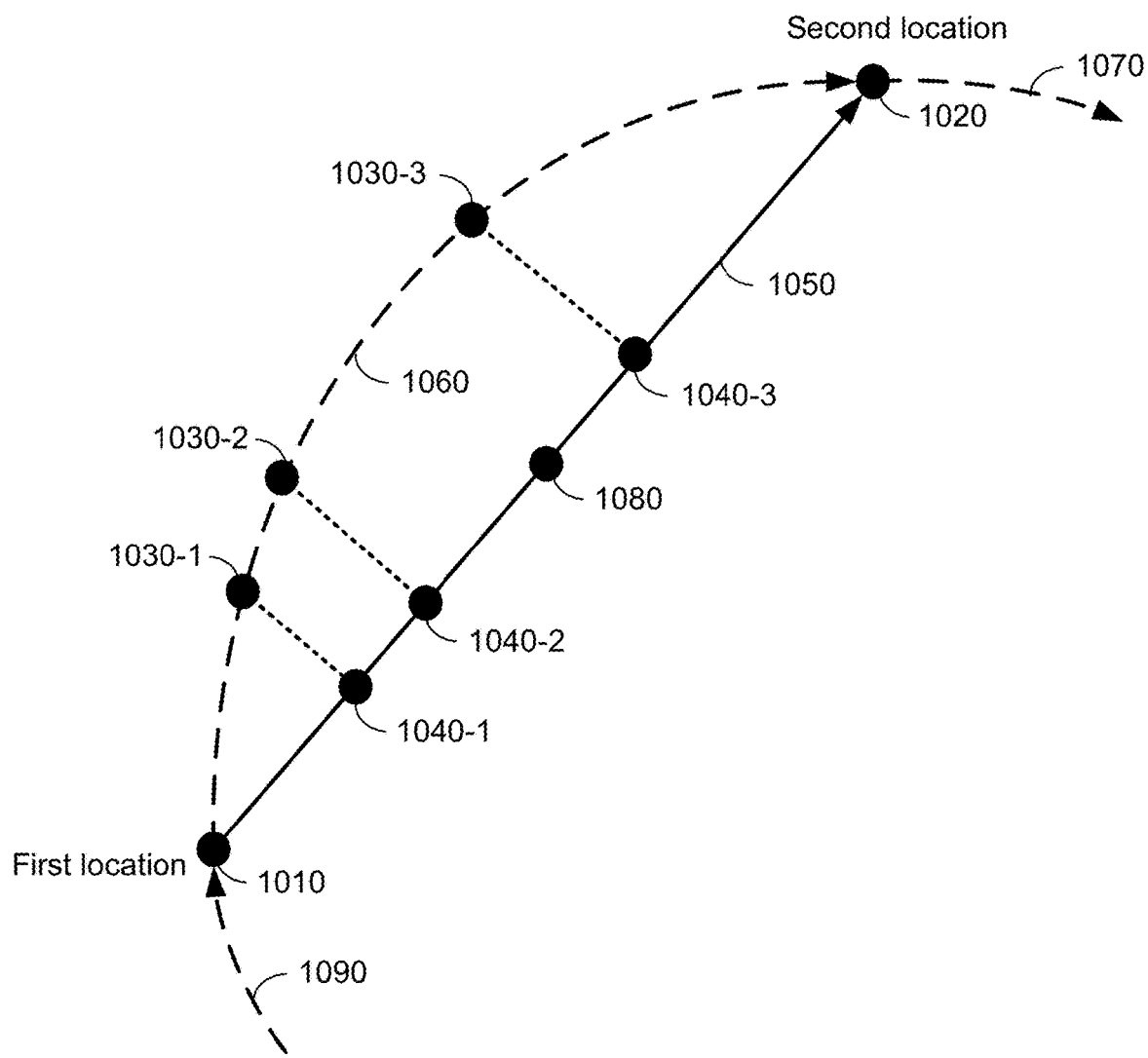
FIG. 10 is a simplified overhead view of an example path traveled by a UE during a period of time in which location measurements are obtained in accordance with techniques disclosed herein.

FIG. 10 is a simplified overhead view of an example path 1060 traveled by a UE 105 (not shown) in a horizontal plane during a period of time in which location measurements are obtained, to help illustrate the techniques described herein. Here, UE 105 starts at a first location 1010 and travels along the path 1060, taking location-related measurements at measurement locations 1030-1, 1030-2, and 1030-3 (collectively referred to herein as "measurement locations 1030") along the way, until UE 105 reaches a second location 1020. Location-related measurements may also occur at the first location 1010 and/or second location 1020. UE 105 can then send information indicative of the location-related measurements to LS 160 to determine an estimated location of UE 105 (or can use the measurements itself to determine an estimated location of UE 105). In some embodiments, an indication of a time at which each of the location-related measurements was obtained (e.g., a timestamp) can be included by UE 105 in the information indicative of the location-related measurements provided to LS 160.

It can be noted that the path 1060 traveled by UE 105 during the period of time in which location-related measurements are obtained may be part of a larger course of travel taken by UE 105. For example, UE 105 may have traveled along an earlier path 1090 prior to arriving at the first location 1010, and/or may travel along a later path 1070 after arriving at the second location 1020.

As previously noted, the movement of UE 105 can cause inaccuracies in a location estimate of UE 105 in at least two ways. First, inaccuracies can arise when the location estimate is based on location-related measurements obtained at different measurement locations 1030, as shown in FIG. 10. The duration of the period of time during which measurements are obtained can vary, depending on various factors and conditions. The duration may be 15-30 seconds, for example (e.g. for an emergency call from UE 105), so the distance between the location of an initial measurement (e.g., the first location 1010) and the location of a final measurement (e.g., the second location 1020) may be substantial (e.g., tens or even hundreds of meters), thereby leading to correspondingly substantial errors in a location estimate for UE 105 based on these measurements.

Second, because UE 105 may continue to move after UE 105 sends the location measurements to LS 160 (e.g., after arriving at the second location 1020, as indicated by later path 1070) and while LS 160 makes the location determination, there may be a discrepancy between a calculated position for UE 105 based on the location measurements and a position of UE 105 at the time the location determination is made by LS 160. Here, too, the distance between these locations may be tens or even hundreds of meters, leading to an inaccurate location estimate of a current position of UE 105.

According to some embodiments, to help mitigate these and/or other inaccuracies that arise due to movement of UE 105, UE 105 can obtain velocity-related measurements during the period of time the other location measurements are obtained. For example, UE 105 may include one or more inertial sensors (e.g., accelerometers, gyroscopes, compass, and/or other Inertial Measurement Units (IMUs)) as well as other sensors (e.g. barometer) with which movement and/or velocity related information may be obtained. The measured movement (e.g. a horizontal and/or vertical distance moved) and/or velocity and/or information indicative thereof, may then be conveyed from UE 105 to LS 160 (or may be used internally by UE 105), enabling LS 160 (or UE 105) to account for the movement of UE 105 when determining the estimated location of UE 105. Additionally or alternatively, movement and/or velocity related measurements may be obtained by UE 105 through other means, such as using satellite and/or terrestrial transceiver-based location measurements (e.g. such as a change in a downlink signal frequency observed by UE 105 caused by a Doppler shift which may indicate a velocity of UE 105).

Depending on desired functionality, information indicative of the movement and/or velocity measurements can be provided by UE 105 to LS 160 in any of a variety of forms. For instance, movement or velocity may be expressed as a straight-line distance traveled by UE 105 for a period of time during which location measurements were obtained together with this period of time. For example, in the case of UE 105 movement according to FIG. 10, UE 105 may provide an indication of the second location 1020 relative to the first location 1010 (e.g., by providing location coordinates for the two locations 1010 and 1020 or the straight line distance between locations 1010 and 1020 along the line 1050 and the direction of the line 1050), and the period of time (or length of time) during which UE 105 traveled from the first location 1010 to the second location 1020. It can be noted that this may assume travel by UE 105 along the straight line 1050, which may deviate from the path 1060 UE 105 actually traveled. However, this may be an acceptable approximation in some instances, because at higher velocities (where location estimates may suffer from larger inaccuracies due to movement) such linear travel is more likely due to physical inertial considerations and design of roads and walking areas (e.g. considering that roads and corridors and hallways in buildings tend to be straight or have only slight curvature except at intersections).

As another example, a movement or velocity of UE 105 may be expressed as a velocity vector, indicating the average velocity (including speed and direction) of UE 105 for the period of time during which location measurements were obtained. Again, information regarding the period or length of time during which UE 105 traveled from the first location 1010 to the second location 1020 may be conveyed with the velocity vector. An LS 160 receiving this information from UE 105 may determine the length of the overall straight line distance 1050 traveled by UE 105 during the period UE 105 was obtaining the location measurements from the product of the period of time with the average velocity.

According to some embodiments, UE 105 may additionally or alternatively provide LS 160 with information indicative of a change in velocity, or acceleration for UE 105. For example, for the example shown in FIG. 10, UE 105 may provide LS 160 with the difference between UE 105 velocity at the first location 1010 and UE 105 velocity at the second location 1020 and together with the period of time in traveling from the first location 1010 to the second location 1020. This difference in velocity may be expressed as a velocity with an associated scalar speed component and a direction. The LS 160 may then obtain the average acceleration of UE 105 as the change in velocity divided by the period of time. Because inertial sensors (e.g. accelerometers) may be particularly suited to measure changes in velocity, velocity measurements indicating a change in velocity may be quite accurate. As with velocity, the UE 105 can express the change in velocity in any of a variety of ways, including as a velocity vector.

Figure 11:
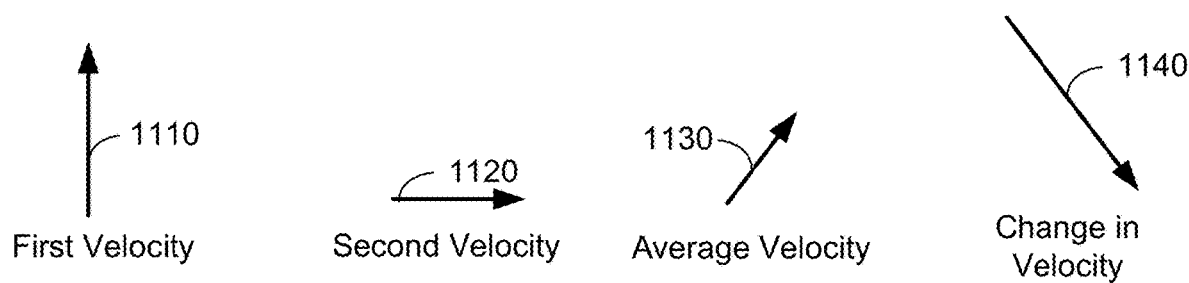
FIG. 11 is an illustration of example velocity vectors indicative of a UE's movement along the path traveled by a UE shown in FIG. 10.

FIG. 11 is an illustration of example velocity vectors indicative of UE 105's movement along path 1060 in FIG. 10, which may be based on measurements of velocity and/or acceleration obtained by UE 105 during UE 105's course of travel from the first location 1010 to the second location 1020. The vector for a first velocity 1110 corresponds to the velocity of UE 105 at the first location 1010, the vector for a second velocity 1120 corresponds to the velocity of UE 105 at the second location 1020, and the vector for the average velocity 1130 represents the average velocity of UE 105 during UE 105's course of travel from the first location 1010 to the second location 1020. The average velocity 1130 may be obtained in several different ways—e.g. may be obtained as the straight line distance traveled by UE 105 from the first location 1010 to the second location 1020 divided by the time of travel.

As noted above, a change in velocity 1140 may additionally or alternatively be provided to LS 160 by UE 105 and may be provided as a velocity vector. The change in velocity 1140 (or mean acceleration or deceleration) may be determined by subtracting the first velocity 1110 from the second velocity 1120 (e.g. using vector subtraction). The LS 160 may use information indicative of the change in velocity 1140 to determine, for example, a relative accuracy of a location fix for UE 105 based on location measurements provided by UE 105. For instance, if the change in velocity is high (e.g. a change in velocity of 80 meters a second or more), then LS 160 may make a determination that a location fix for UE 105 that was obtained without taking into account other velocity-related measurements will likely be relatively inaccurate. Such a determination may be possible even when no information regarding the absolute velocity of UE 105 is provided by UE 105 to LS 160 (e.g. if UE 105 is able to provide a change in velocity 1140 or mean acceleration or deceleration to LS 160 but not a mean velocity 1130 or distance and direction traveled by UE 105).

The LS 160 can use the information indicative of the location measurements and movement or velocity measurements provided by UE 105 to determine an estimated location of UE 105 (and possibly an indication of error or level of accuracy), accounting for a velocity (and/or change in velocity) of UE 105. This can be done in several ways.

In a first technique, LS 160 may extrapolate the location of UE 105 from a previous time to a current (or future) time. To extrapolate the location of UE 105, LS 160 may compensate for the lag time between the time during which the location measurements were obtained by UE 105 and a current time (e.g., a time the estimated location is determined). That is, LS 160 may determine or obtain (e.g. from UE 105) the velocity (and/or acceleration) of UE 105 during the period of time during which the measurements were obtained and estimate an average or current velocity of UE 105 after this period of time. The LS 160 may then use this average or current velocity and the length of the time lag to determine an estimated location of UE 105 at the current time (or at a future time) and/or an expected error or uncertainty for the estimated location. For example, in the example shown in FIG. 10, LS 160 may assume that the location determined for UE 105 based on location measurements obtained by UE 105 for measurement locations 1030-1, 1030-2 and 1030-3 refers to some location along the UE path 1060. The LS 160 may approximate the path 1060 by the straight line 1050 which LS 160 can determine from velocity related information provided by UE 105 as previously described. If LS 160, for example, assumes that the location estimate obtained for UE 105 most probably (or with least error) refers to the midpoint 1080 of the straight line 1050, LS 160 may extrapolate the location estimate to the second location 1020 by adding (or subtracting) X and Y coordinate increments corresponding to the straight line segment from the midpoint 1080 to the second location 1020. The extrapolated location estimate may now refer to the location of UE 105 at the time when location measurements were completed. To allow for subsequent movement of UE 105 following this time and up to the current time of location determination by LS 160, LS 160 may assume that UE 105 continues to move from the second location 1020 with (i) the average velocity 1130, (ii) the average velocity 1130 combined with the change in velocity 1140, or (iii) the second velocity 1120. In some embodiments, LS 160 may prefer to use (iii) if the second velocity 1120 is provided by UE 105, otherwise (ii) if the average velocity 1130 and the change in velocity 1140 are provided by UE 105 or otherwise (i).

In a second technique, LS 160 may include the relative locations of UE 105 at which different measurements were obtained by UE 105 into the determination of the location of UE 105 at some specific time. For example, if the location-related measurements have timestamps to indicate when each measurement was obtained, LS 160 (or UE 105) may approximate locations, along the straight line 1050 between the first location 1010 and the second location 1020, where (approximately) these location-related measurements were obtained. For example, if UE 105 provided timestamps corresponding to the times at which location-related measurements were obtained at measurement locations 1030-1, 1030-2, and 1030-3, LS 160 may be able to use the timestamps to approximate these measurement locations by determining respective locations 1040-1, 1040-2, and 1040-3 (as shown in FIG. 10), along the straight line 1050. If provided by UE 105, LS 160 may also take into account a change in velocity for UE 105 to determine the respective locations 1040-1, 1040-2, and 1040-3 with greater accuracy.

As an example, if UE 105 provides LS 160 with the average velocity of UE 105 between the first location 1010 and the second location 1020 as a velocity vector 1130 and provides the period of time elapsing between the first location 1010 and second location 1020, LS 160 can determine the length of the straight line 1050 (as the product of the scalar magnitude of the average velocity and the period of time) and the direction of the straight line 1050. The LS 160 can then determine the locations 1040-1, 1040-2 and 1040-3 by assuming UE 105 moves at a constant velocity, equal to the average velocity 1130, along the straight line 1050 during the period of location measurements. For example, if X and Y are the (unknown) horizontal location coordinates for the first location 1010 in some (e.g. local) coordinate system, then the x and y coordinates for a location 1040-$n$ (n=1, 2 or 3) may be obtained as:

$$x = X + (VT \cos \alpha) \quad \text{(Eq. 11)}$$

$$y = Y + (VT \sin \alpha) \quad \text{(Eq. 12)}$$

where:
V=scalar magnitude of the average velocity 1130
$\alpha$=angle between the direction of the average velocity 1130 and the X axis
T=time period between UE 105 starting location measurements at the first location 1010 and obtaining measurements at a location 1030-$n$.

Equations (11) and (12) show that if LS 160 approximates the measurement locations 1030-1, 1030-2 and 1030-3 by the locations 1040-1, 1040-2 and 1040-3 along the straight line 1050, the approximate x and y coordinates for each of the locations 1030-1, 1030-2 and 1030-3 can be obtained in terms of the unknown X and Y coordinates for the first location 1010 and the known magnitude, direction and duration of the average velocity 1130 of UE 105 along the straight line 1050 (which is assumed to be constant in Equations (11) and (12)). The location measurements provided by UE 105 to LS 160 for each of the measurement locations 1030-1, 1030-2 and 1030-3 will typically provide or enable some equation relating the location coordinates ((x, y) or (x, y, z) when altitude is included) for each measurement location. For example, as is well known, an RSTD measurement for OTDOA for UE 105 may define a 2-dimensional hyperbola (or 3-dimensional hyperboloid) on which the x and y (or x, y, and z) coordinates of UE 105 at the time the RSTD is measured are located, which may provide a corresponding equation relating the coordinates. An RTT measurement for UE 105 may similarly define a circle (or sphere) centered at the base station 120 or AP 130 for which the RTT was obtained on which the x and y (or x, y and z) coordinates of UE 105 at the time of measuring the RTT are located, which may provide another equation. A code phase or pseudorange measurement of a GNSS satellite 110 may similarly define a relationship between UE 105 x, y and z coordinates at the time of measurement and the precise time of measurement, which may provide a further equation. A DAOA measurement for UE 105 may also define an arc of a circle (or a surface corresponding to the rotation of an arc of a circle) as described for FIGS. 7A and 7B on which the x and y (or x, y, and z) coordinates of UE 105 at the time the DAOA is measured are located, which may provide a corresponding equation relating the coordinates. Based on the time of each measurement, LS may use Equations (11) and (12) to replace the coordinates x and y in any one or more of these equations with the coordinates X and Y for the first location 1010 (e.g. and may assume that the z coordinate, if present, in any of these equations does not change and equals the Z coordinate for the first location 1010). LS 160 may then solve for the X, Y (and Z) coordinates of the first location 1010 using these equations as well possibly as the exact time(s) of measurement at which a GNSS code phase or pseudorange measurement or a DAOA measurement is obtained by UE 105.

In other examples, LS 160 (or UE 105) could solve for the x, y (and z) coordinates of the second location 1020 or for the x, y (and z) coordinates of some other location along the straight line 1050 using a technique similar to that just described for the first location 1010. If UE 105 provides more detailed information to LS 160 regarding the velocity or movement of UE 105 while obtaining the measurements between the first and second locations 1010 and 1020 (e.g. such as the exact instantaneous velocity of UE 105 at the first location 1010, second location 1020 and each of the locations 1030-1, 1030-2 and 1030-3 or the exact relative location for each of these locations), LS 160 (or UE 105) may be better able to determine the true path 1060 of UE 105 in FIG. 10 and determine more accurate equations for the x and y coordinates of UE 105 at the measurement locations 1030-1, 1030-2 and 1030-3 than Equations (11) and (12).

In a third technique, LS 160 may calculate an expected error or uncertainty in a location estimate for UE 105 based on movement or velocity information for UE 105. If movement or velocity-related measurements indicate UE 105 is not moving, for example, LS 160 may assume that the location measurements provided by UE 105 are all for the same location and may therefore assign a correspondingly lower expected error or uncertainty for the location estimate for UE 105 determined by LS 160 from the provided location measurements. For example, LS 160 may use any indication of error, quality or statistical uncertainty (e.g. a standard deviation) provided by UE 105 to LS 160 for each location measurement to determine an overall cumulative expected error or uncertainty in a determined location estimate, and may not increase this expected error or uncertainty to compensate for errors that might otherwise have occurred had UE 105 been moving while obtaining location measurements. Alternatively, if movement or velocity-related measurements indicate UE 105 is moving, LS 160 may assume that the location measurements provided by UE 105 were obtained for a number of different locations, as exemplified in FIG. 10, and may assign a higher expected error or uncertainty to either the final determined location estimate for UE 105 or to each location measurement provided to LS 160 by UE 105 that is used by LS 160 to determine the final location estimate. In the latter case, the higher expected error or uncertainty assigned to each location measurement by LS 160 may lead to the determination of a correspondingly higher expected error or uncertainty in the determined location estimate. The higher expected error or uncertainty that is added by LS 160 to the final location estimate or to each location measurement may be related to the distance moved by UE 105 while obtaining location measurements. For example, the added uncertainty or expected error might be set equal to or be based on the straight line distance, or some fraction of the straight line distance (e.g. half the straight line distance), between first location 1010 and second location 1020 in the example in FIG. 10.

In a fourth technique, which may be similar to the second technique, a UE 105 may provide an LS 160 with timestamps for individual location measurements (e.g. AOA or DAOA measurements) and information on UE 105 movement (e.g. trajectory with timestamps). As an example, LS 160 could use the trajectory information to infer the location X (e.g. represented as a 3-tuple comprising x, y and z coordinates) of UE 105 at any time T relative to, and as a known function F of, the location X* (e.g. also a 3-tuple) of UE 105 at the current time T* or at some specific time T* in the past. Thus, LS 160 could determine:

$$X = F(X^*, T-T^*) \quad \text{(Eq. 13)}$$

For example, if UE 105 moves at a constant velocity V along the y axis in the direction of increasing y, then the trajectory information may define F according to the following equations relating the x,y,z coordinates for X to the x*,y*,z* coordinates for X*.

$$x = x^* \quad \text{(Eq. 14)}$$

$$y = y^* + (T-T^*)V \quad \text{(Eq. 15)}$$

$$z = z^* \quad \text{(Eq. 16)}$$

The function F in Equation (13) in this example would then embody Equations (14) to (16) or some approximation to them as provided by the trajectory information.

In the case of AOA, the time T* might refer to the time of measurement of an AOA for the reference cell by UE 105 which could be common to all differential AOA (DAOA) measurements. A measurement (e.g. a DAOA or AOA for a neighbor cell) for the location X and time T by UE 105 could provide one equation relating the location X coordinates and possibly the time T to known quantities, such as eNB locations and DAOA or AOA measurements and the location X* and possibly time T*. By replacing each occurrence of X (and T) in such an equation with X* (and T*) using Equation (13), an equation for the location X* (e.g. X* coordinates) could be obtained.

Figure 12:
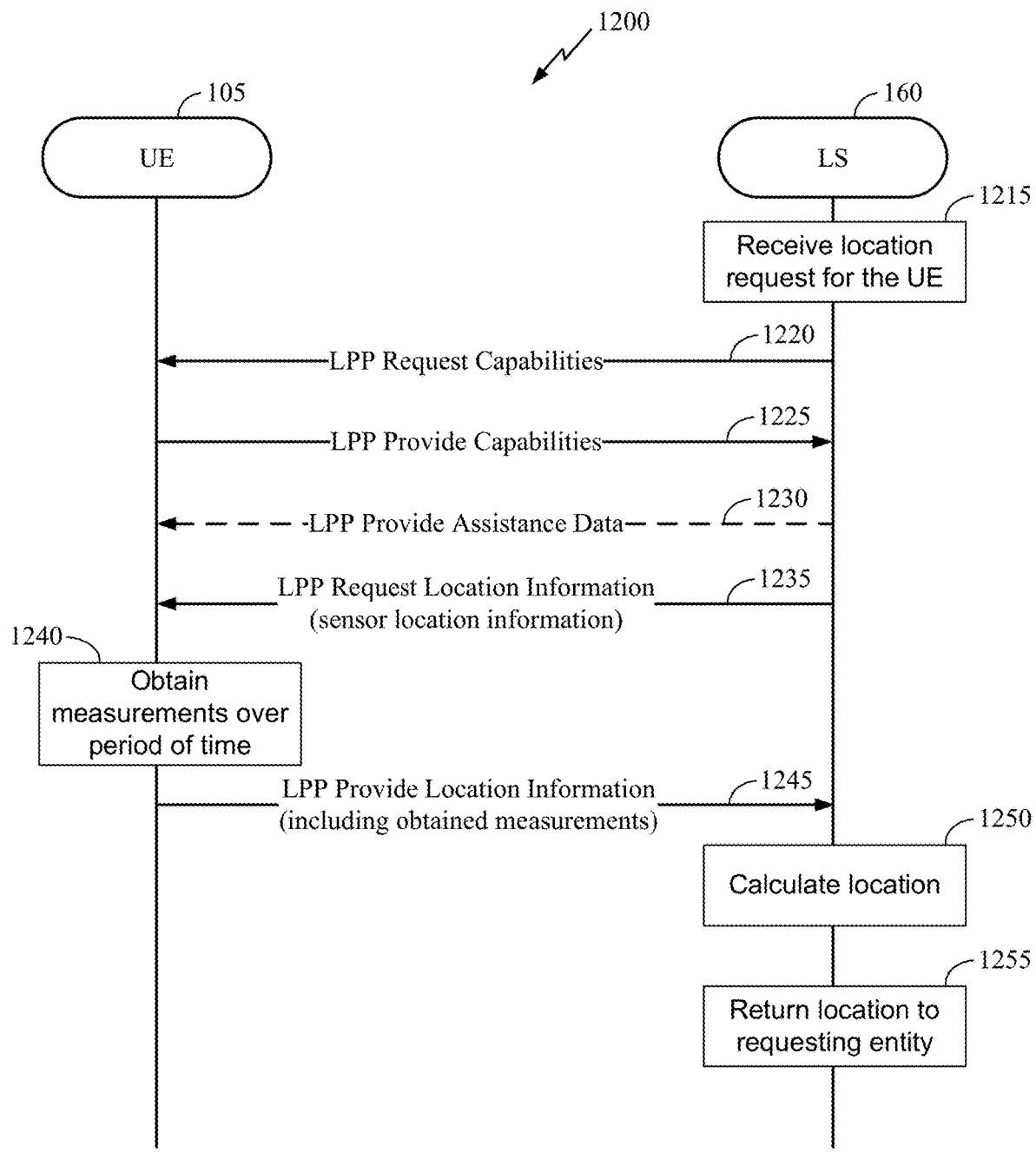
FIG. 12 is diagram of a signaling flow illustrating communication between a UE and a location server that can take place, according to an embodiment.

FIG. 12 is diagram of a signaling flow 1200 illustrating communication between UE 105 and LS 160 that can take place in accordance with the techniques provided herein, according to an embodiment. It can be noted that here, messages are provided in accordance with the 3GPP LPP protocol as an example. However, embodiments are not so limited. For example, a combination of LPP and LPPe, referred to as LPP/LPPe, might be used in another embodiment where base stations 120 provide UE 105 with LTE wireless access to network 170. In a further embodiment, an NR positioning protocol (NPP or NRPP) might be used where base stations 120 provide UE 105 with NR wireless access to network 170. It can be additionally noted that communication between the UE 105 and LS 160 may be relayed via various 5G network components that are not shown in FIG. 12. These components can include components of an NG-RAN and/or 5GCN, such as an Access and Mobility Management Function (AMF) and/or a base station (e.g., a gNB or ng-eNB).

At block 1215, signaling flow 1200 may be initiated when LS 160 receives a location request for UE 105. The location request may come from any of a variety of entities, including LS 160 itself, depending on the situation. For example, an external client 180 (e.g., as illustrated in FIG. 1) may send a request for the location of UE 105 to LS 160. Additionally or alternatively, the location request may come from UE 105 or an entity in network 170 such as a Mobility Management Entity (MME), a Gateway Mobile Location Center (GMLC), an Access and Mobility Management Function (AMF) or a Location Retrieval Function (LRF). This request may be triggered, for example, by an application executed by UE 105 or by an external client 180.

At action 1220, LS 160 may send an LPP Request Capabilities message to UE 105 to request the positioning capabilities of UE 105. The UE 105 can respond in accordance with the LPP protocol by providing various location-related capabilities of UE 105, such as capabilities to support different position methods (e.g. including AOA and/or DAOA), and may further indicate the location measurements and/or assistance data which can be supported by UE 105 for each supported position method. According to some embodiments, movement and velocity-related capabilities may also be provided by UE 105. These capabilities may indicate, for example, whether UE 105 is capable of obtaining and providing sensor location information and an indication of which types of measurements regarding the sensor location information UE 105 is able to provide, and so forth. For example, UE 105 could indicate a capability to provide velocity, acceleration, change in location, orientation, and/or change in orientation of UE 105. UE 105 may also or instead indicate its capability to provide a timestamp, an instantaneous velocity, an instantaneous acceleration and/or a relative location for each location (or each small interval of time) at which a location measurement is obtained. These capabilities are provided by UE 105 at action 1225 in the LPP Provide Capabilities message sent by UE 105 to LS 160.

At action 1230, LS 160 may send UE 105 an LPP Provide Assistance Data message, in response to receiving the LPP Provide Capabilities message at action 1225. Here, the LPP Provide Assistance Data message may provide assistance data to UE 105, where the assistance data is able to support one or more position methods supported by both UE 105 and LS 160 and is commensurate with the capabilities of UE 105, as indicated in the LPP Provide Capabilities message. For example, if UE 105 indicates that it is capable of obtaining AOA and/or DAOA measurements from RF signals received from base stations 120, LS 160 may provide a list of cells supported by nearby base stations 120 (e.g. determined based on a current serving cell or current serving base station 120 for UE 105) and information (e.g. timing, frequency, bandwidth, code sequence, muting) for signals transmitted in these cells such as a positioning reference signal (PRS), a tracking reference signal (TRS), or a Cell-specific Reference Signal (CRS) used for AOA and/or DAOA measurements (e.g. as further described here in association with FIGS. 2 and 3). Similarly, if UE 105 indicates support of A-GNSS in the LPP Provide Capabilities message sent at action 1225, LS 160 may include information for visible GNSS satellites 110 in the LPP Provide Assistance Data message sent at action 1230 (e.g. such as almanac data, ephemeris data, SV IDs and acquisition assistance data). Action 1230 may be optional and may not occur in some implementations.

At action 1235, LS 160 sends an LPP Request Location Information message to UE 105 to request location measurements from UE 105 for one or more position methods supported by UE 105, as indicated at action 1225. Here, LS 160 may request location information that includes both AOA and/or DAOA measurements and sensor location information (which may include measurements related to UE angular orientation, change of orientation, movement, velocity, and/or acceleration, as noted above). In some embodiments, the request for sensor location information may be based on an indication in the LPP Provide Capabilities message sent by UE 105 at action 1225 that UE 105 is capable of providing measurements related to orientation, change of orientation, movement, velocity, and/or acceleration. For example, in one embodiment, LS 160 may request UE 105 to provide a velocity for UE 105 during the period of location measurements, an acceleration for UE 105 during the period of location measurements, and the period of time for the location measurements. In another embodiment, LS 160 may request UE 105 to provide one or more of a timestamp, an instantaneous velocity, an instantaneous acceleration or a relative location for each location (or each small interval of time) at which a requested location measurement is obtained by UE 105. In some embodiments, the LPP Request Location Information message may also include a requested accuracy for any location measurements or location estimate and/or a maximum response time.

Following action 1235, in some embodiments (not shown in FIG. 12), UE 105 may request assistance data from LS 160 to help enable the location-related measurements requested at action 1235 (e.g. by sending an LPP Request Assistance Data message to LS 160). LS may then return some or all of the requested assistance data to UE 105 (e.g. by sending an LPP Provide Assistance Data message to UE 105 as at action 1230).

At block 1240, UE 105 obtains some or all of the measurements requested at action 1235 (e.g. both the AOA and/or DAOA measurements and the movement, orientation, velocity, or acceleration-related measurements that comprise sensor location information) over a period of time. As previously indicated, the length of this period of time may vary, depending on various factors such as environmental factors, a desired minimum number of measurements, a requested accuracy and/or a requested maximum response time. The AOA and/or DAOA measurements obtained by UE 105 may be obtained for Radio Frequency (RF) signals transmitted by base stations 120, APs 130, and/or other transceivers, in the manner previously described in relation to FIGS. 1-9B. For example, the location-related measurements may include measurements of AOA and/or DAOA obtained by measuring PRS or other reference signals (e.g. CRS or TRS signals) transmitted by base stations 120.

The sensor location information may comprise movement, orientation, and/or velocity-related measurements, which may be obtained by UE 105 at block 1240 using inertial sensors within, attached to or accessible from UE 105 and may include the measurements previously described such as velocity, acceleration, change in location, orientation, and/or change in orientation of the UE 105. In some embodiments, UE 105 may obtain a timestamp indicating an absolute time or relative time for each of the measurements of the sensor location information and/or may determine an uncertainty or expected error associated with each measurement. The UE 105 may ignore motion of UE 105 (e.g. may assume that UE 105 is stationary during the period of time for obtaining location measurements) when obtaining any expected error or uncertainty for a location-related measurement. Therefore, UE 105 may not add any additional expected error or uncertainty to any of the location-related measurements to allow for possible movement or velocity of UE 105 while obtaining the location-related measurements. Instead, UE 105 may allow LS 160 to determine any contribution of UE 105 movement, change of orientation, or velocity to an expected error or uncertainty in a measurement or final determined location estimate as described previously. In some embodiments, UE 105 may track its relative or absolute orientation between AOA measurements and provide AOA or DAOA measurements with respect to a common relative or absolute reference frame which may also be provided to the LS 160 by UE 105. In such instances, the LS 160 may not need orientation measurements from UE 105 to determine the UE location using AOA and/or DAOA positioning.

At action 1245, location information comprising information indicative of the location measurements (e.g. AOA and/or DAOA measurements) and sensor location information obtained at block 1240 is sent to LS 160 by UE 105 in an LPP Provide Location Information message. In one embodiment, sensor location information may include one or more of an average velocity for UE 105 during the period of location measurements, a change in velocity for UE 105 during the period of location measurements, the period of time for the location measurements, and/or, for each location-related measurement, a timestamp, an instantaneous velocity, an instantaneous acceleration and/or a relative location.

At block 1250, LS 160 can use the location information received at action 1245 (e.g. indicative of one or more AOA and/or DAOA measurements and sensor location information) to calculate an estimated location of UE 105. As indicated above, the location estimate can account for a velocity, acceleration, change in location, orientation, or change in orientation of the UE 105 for the period of time during which the location measurements were obtained at block 1240, based on the one or more movement or velocity-related measurements. For example, in the case of AOA and/or DAOA measurements, the location estimate may be obtained with higher accuracy by LS 160 as described previously (e.g. with respect to FIGS. 9A and 9B). In some embodiments, an uncertainty or expected error in the calculated location estimate may also be determined by LS 160 at block 1250, based on the one or more movement or velocity-related measurements received at action 1245.

According to some embodiments, the information indicative of the one or more location-related measurements may be based on determining by LS 160 that UE 105 is stationary or almost stationary during the period of time based on the movement or velocity-related measurements. The calculated location estimate (and any accompanying uncertainty or expected error, if determined) may then be returned to the requesting entity at block 1255.

In a variant of signaling flow 1200 (not shown in FIG. 12), following block 1240, UE 105 may calculate an estimated location of UE 105 based on the location measurements (e.g. AOA and/or DAOA measurements) and sensor location information obtained by UE 105 at block 1240. For example, the location calculation by UE 105 may be assisted by assistance data received by UE 105 from LS 160 such as the assistance data received at action 1230. The assistance data may include, for example, the antenna locations for base stations 120 and/or APs 130 measured by UE at block 1240. The location calculation by UE 105 may be similar to or the same as that described for LS 160 at block 1250 and may be similarly based on the techniques described previously with respect to FIGS. 1-11. With this variant of signaling flow 1200, UE 105 may send the estimated location for UE 105 calculated by UE 105 to LS 160 at action 1245 and block 1250 may not occur.

It can be noted that, in the process illustrated by the signaling flow 1200 in FIG. 12, non-AOA measurements may be utilized in addition to AOA and/or DAOA measurements, according to some embodiments. In this "hybrid" approach that utilizes both non-AOA and non-DAOA measurements and AOA and/or DAOA measurements, the UE 105 may additionally obtain non-AOA and non-DAOA measurements (e.g., at block 1240), and provide those measurements to the LS 160 (e.g., in the LPP Provide Location Information message sent at action 1245). This can be done in at least two scenarios.

First, non-AOA/DAOA measurements may be utilized when there is an insufficient number of AOA/DAOA measurements to determine a location of the UE 105. For example, referring to FIG. 9A, AOA measurements from just two locations of UE 105 may be sufficient to provide only one of the curves C1 and C2* intersecting at the point P1* in FIG. 9A. If that is the case, the UE 105 may obtain another non-AOA measurement (e.g. an RTT or RSTD measurement) to determine another curve that would intersect with the first curve at the point P1* and thereby enable a location for the point P1* to be obtained.

Second, non-AOA/DAOA measurements may be utilized when there is a sufficient number of AOA/DAOA measurements to determine a location of the UE 105, but where the accuracy of this location determination is low (e.g., below an accuracy threshold, when an error estimate is above a threshold, etc.). Non-AOA/DAOA measurements (e.g. RTT, RSTD, RSRP and/or RSRQ measurements) may then be used to provide additional "location relationships" (e.g. equations which define, relate or constrain the coordinates of a UE 105 location) and improve accuracy. In such cases, different location relationships (determined from different measurement types) may be combined, such as by averaging, determining a least-squares value, or by some other technique. As one example, location relationships that relate the coordinates of a location of UE 105 or of a related point (e.g. the point P1* or P2* in FIG. 9A) to one another via some equation may be obtained using AOA and/or DAOA measurements (e.g. as described for FIGS. 9A and 9B) and using other non-AOA/DAOA measurements. The location of UE 105 or of the related point may then be determined as a "least squares location" for which the sum of the squares of the errors for each of the measurements is smallest, where an error corresponds to the minimum amount by which the least squares location is displaced from locations satisfying the location relationship for any measurement. (A person of ordinary skill in the art will appreciate additional and/or alternative ways in which different location relationships may be combined.)

Non-AOA/DAOA measurements may comprise any of a variety of measurement types, depending on desired functionality, capabilities of the UE 105 and/or LS 160, and/or other factors. For example, non-AOA measurements may comprise, a TOA measurement, an RSTD measurement, an RTT measurement, a Received Signal Strength Indicator (RSSI) measurement, an RSRP measurement, an RSRQ measurement, or any combination thereof.

Figure 13:
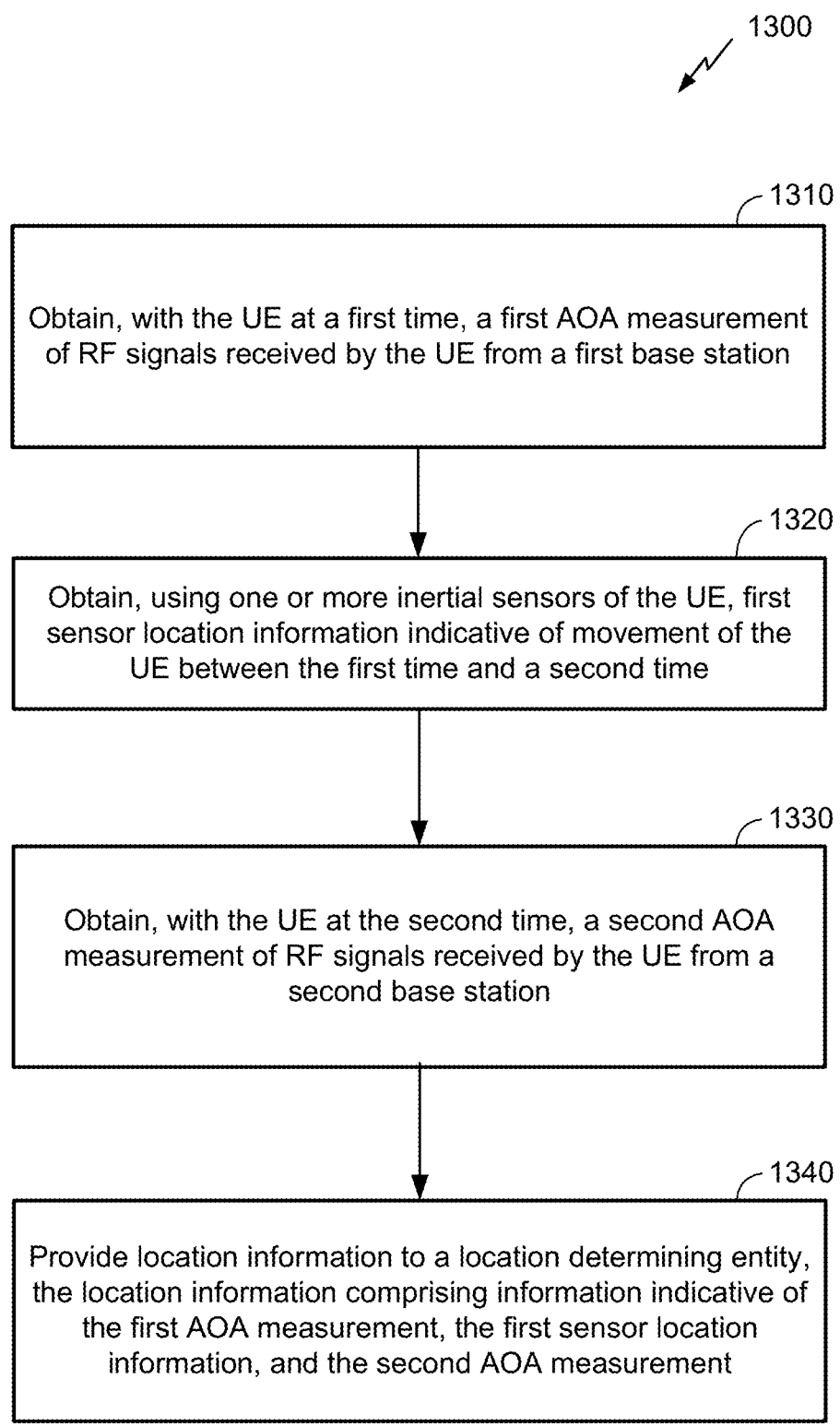
FIG. 13 is a flow diagram of a method of determining a location of a UE that may be performed by a UE, according to an embodiment.

FIG. 13 is a flow diagram illustrating a method 1300 of determining a location of a UE, according to an embodiment. It can be noted that, as with figures appended hereto, FIG. 13 is provided as a non-limiting example. Other embodiments may vary, depending on desired functionality. For example, the functional blocks illustrated in method 1300 may be combined, separated, or rearranged to accommodate different embodiments. The method 1300 may be performed by a UE such as UE 105. Means for performing the functionality of method 1300 may include hardware and/or software means of a UE, such as UE 105 shown in FIG. 15 and described below.

The method 1300 may start at block 1310. The functionality at block 1310 includes obtaining, with the UE at a first time, a first AOA measurement of RF signals received by the UE from a first base station. For example, the first AOA measurement may correspond to the AOA measurement obtained by UE 105 at position P0 in the example for FIG. 9A or the example for FIG. 9B. Techniques for obtaining the first AOA measurement may comprise, for example, one or more of the methods described in relation to FIGS. 4-6, described above. Means for performing the functionality at block 1310 can include, for example, processing unit(s) 1510, bus 1505, memory 1560, wireless communication interface 1530, wireless communication antenna(s) 1532, GNSS receiver 1580, GNSS antenna 1582, and/or other hardware and/or software components of UE 105 as shown in FIG. 15 and described below.

The functionality at block 1320 comprises obtaining, using one or more inertial sensors of the UE, first sensor location information indicative of movement of the UE between the first time and a second time. Here, the UE can employ one or more gyroscopes, magnetometers, accelerometers, altimeters, and/or other sensors to track a change in orientation and/or location of the UE, thereby enabling a determination of a relative change in the UE's location and/or orientation between the first time to a second time. Depending on desired functionality, the first sensor location information may comprise information regarding the UE including a velocity, acceleration, change in location, orientation, or change in orientation of the UE, or any combination thereof. For example, the first sensor location information may comprise information for the vector 910 in the example for FIG. 9A or the vector 960 in the example for FIG. 9B, such as the distance D1 and/or angle α1 in FIG. 9A or the distance B1 and/or angle β1 in FIG. 9B.

Figure 15:
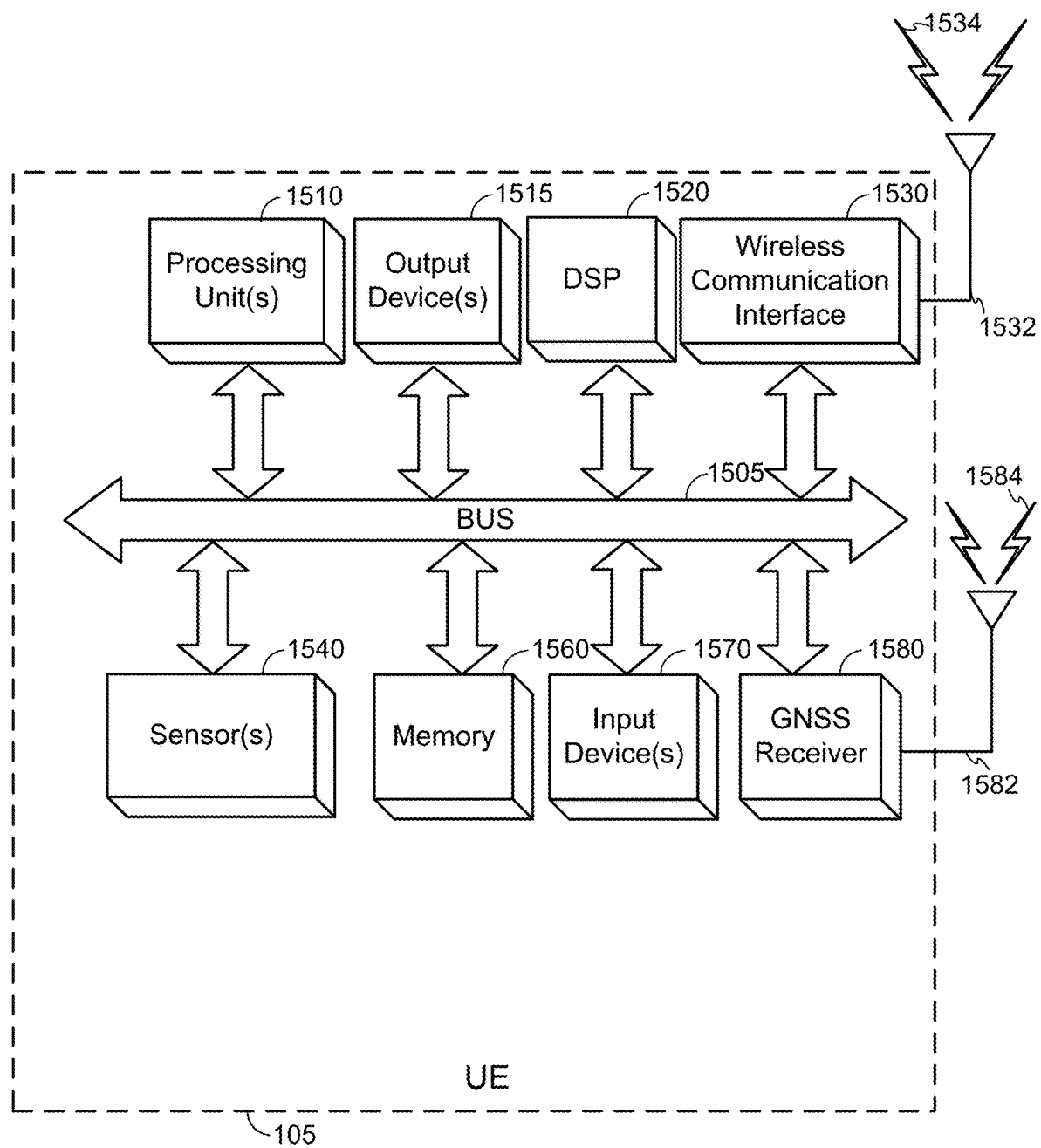
FIG. 15 is a block diagram of an embodiment of a UE.

Means for performing the functionality at block 1320 can include, for example, processing unit(s) 1510, bus 1505, memory 1560, sensor(s) 1540, and/or other hardware and/or software components of UE 105 as shown in FIG. 15 and described below.

At block 1330, the functionality comprises obtaining, with the UE at the second time, a second AOA measurement of RF signals received by the UE from a second base station. For example, the second AOA measurement may correspond to the AOA measurement obtained by UE 105 at position P1 in the example for FIG. 9A or the AOA measurement obtained by UE 105 at position Q1 in the example for FIG. 9B. Depending on desired functionality, the method may further comprise adjusting the first AOA measurement, the second AOA measurement, or both AOA measurements, based on a common orientation for the UE at the first time and at the second time, where the location information is based on the common orientation for the UE. The functionality of blocks 1310-1330 may correspond to the functionality at block 1240 of FIG. 12. Means for performing the functionality at block 1330 can include, for example, processing unit(s) 1510, bus 1505, memory 1560, wireless communication interface 1530, wireless communication antenna(s) 1532, and/or other hardware and/or software components of the UE 105 as shown in FIG. 15 and described below.

The functionality at block 1340 comprises providing location information to a location determining entity, where the location information comprises information indicative of the first AOA measurement, the first sensor location information, and the second AOA measurement. The location determining entity may vary, depending on the scenario, for example, in some scenarios, the location determining entity may comprise an LS (e.g. LS 160), such as an E-SMLC, LMF or H-SLP. In such instances, the functionality of block 1340 may correspond to the functionality at action 1245 of FIG. 12. Moreover, in such instances (e.g. as at block 1250 for FIG. 12 and as described for FIGS. 9A and 9B), the LS may further determine a location for the UE based, at least in part, on the information indicative of the first AOA measurement, the first sensor location information, and the second AOA measurement. In other scenarios, the UE may comprise the location determining entity, in which case providing location information at block 1340 may comprise providing the location information from one function or process executed by a processor of the UE to another. In scenarios in which the UE comprises the location determining entity, the method may further comprise determining a location for the UE based, at least in part, on the information indicative of the first AOA measurement, the first sensor location information, and the second AOA measurement.

Time (or timestamp) information may also be included in the location information provided at block 1340. Thus, in some embodiments, the location information may further comprise information indicative of the first time, the second time, and one or more times at which measurements associated with the first sensor location information were taken.

In some embodiments, DAOA measurements may be used. For example, in some embodiments, the method 1300 may further comprise obtaining a DAOA measurement between the first base station and the second base station based on the first AOA measurement and the second AOA measurement, and including information indicative of the DAOA measurement in the location information provided at block 1340. In some embodiments, the method may further comprise obtaining a measurement of a second angle between the first base station and the second base station based on the first AOA measurement and the second AOA measurement, where the measurement of the second angle is independent of the DAOA measurement, and including information indicative of the measurement of the second angle in the location information provided at block 1340

(e.g. as described previously in association with FIG. 8). As noted in the embodiments described above (e.g. for FIG. 8), the second angle may comprise an angle of elevation or an azimuth angle.

In some scenarios, the UE may be at different locations at different times (e.g. as described previously for FIGS. 9A and 9B). Thus, according to some embodiments, the UE may be located at a first location at the first time (e.g. at the location P0 in FIG. 9A or FIG. 9B) and at a second location (e.g. at the location P1 in FIG. 9A or the location Q1 in FIG. 9B), different to the first location, at the second time. In such instances, the method 1300 may further comprise obtaining, with the UE at a third time and at a third location (e.g. the location P2 in FIG. 9A or one of the additional positions referred to for FIG. 9B), different to the first location and the second location, a third AOA measurement of RF signals received by the UE from a third base station, obtaining, using one or more inertial sensors of the UE, second sensor location information, where the second sensor location information is indicative of movement of the UE between the second time and the third time, and including, in the location information, information indicative of the third AOA measurement and the second sensor location information. Here, the location determining entity can determine a location for the UE further based, at least in part, on the information indicative of the third AOA measurement and the second sensor location information (e.g. as described previously here in association with FIGS. 9A and 9B).

In some scenarios, as noted above, the UE may include non-AOA and non-DAOA measurements as part of the location information provided at block 1340. That is, according to some embodiments, the UE may obtain, at one or more times, one or more non-AOA and non-DAOA measurements of RF signals received by the UE from one or more base stations. The UE may then include information indicative of the one or more non-AOA and non-DAOA measurements in the location information provided at block 1340. The one or more non-AOA and non-DAOA measurements may comprise, for example, a TOA measurement, an RSTD measurement, an RTT measurement, an RSSI measurement, an RSRP measurement, an RSRQ measurement, or any combination thereof. Here, according to embodiments, the one or more base stations may include the first base station, the second base station, or both base stations. Additionally or alternatively, the one or more times may include the first time, the second time, or both times.

Means for performing the functionality at block 1340 can include, for example, processing unit(s) 1510, bus 1505, memory 1560, wireless communication interface 1530, wireless communication antenna(s) 1532, and/or other hardware and/or software components of the UE 105 as shown in FIG. 15 and described below.

In some embodiments, the UE provides the location information to the location determining entity at block 1340 using an LPP, LPP/LPPe or NPP protocol.

Figure 14:
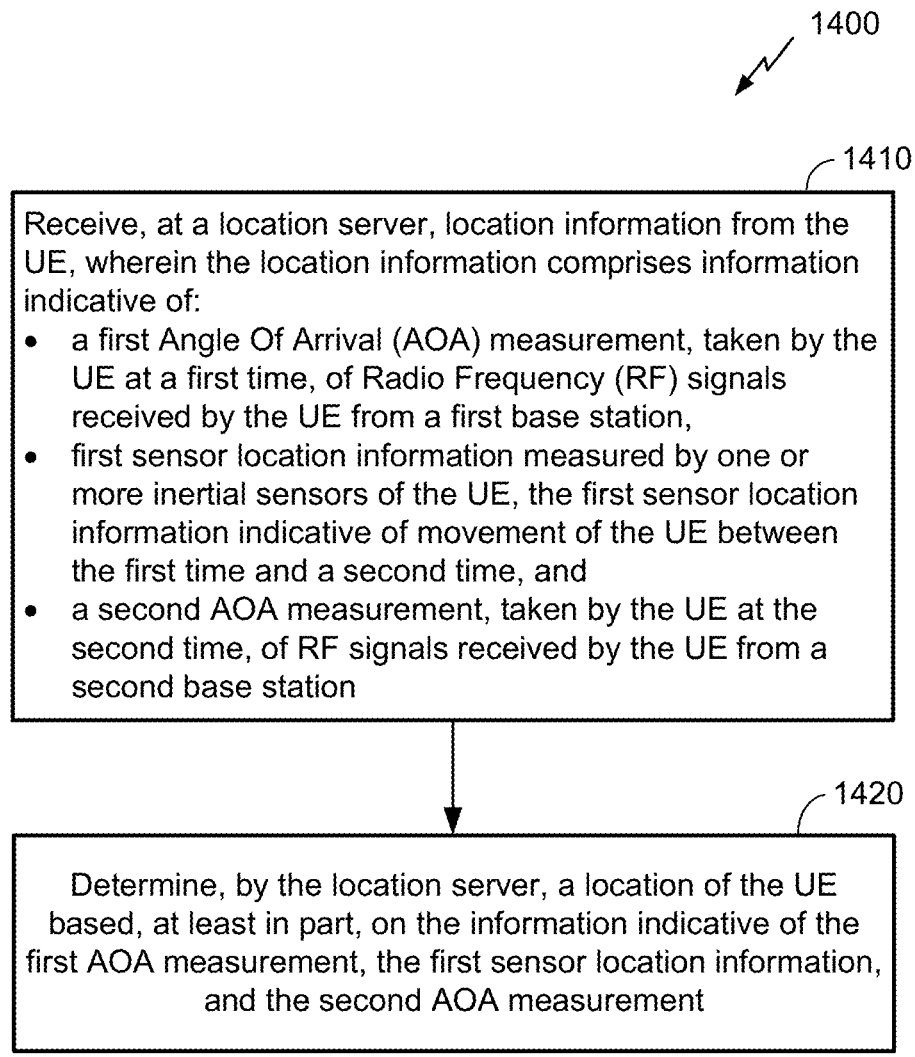
FIG. 14 is a flow diagram of a method of determining a location of a UE that may be performed by a location server, according to an embodiment.

FIG. 14 is a flow diagram illustrating a method 1400 of determining a location of a UE (e.g. UE 105), according to an embodiment. Again, FIG. 14 is provided as a non-limiting example, and a person of ordinary skill in the art will appreciate that other embodiments may vary from the method 1400 as shown. The method 1400 may be performed by a location server such as the location server 160 (e.g. which may be an E-SMLC, SUPL SLP or LMF). Means for performing the functionality of method 1400 may include hardware and/or software means of a computer system, such as the computer system 1600 shown in FIG. 16 and described below.

The method 1400 may start at block 1410. At block 1410, the functionality comprises receiving, at a location server (LS), location information from the UE, where the location information comprises information indicative of: (i) a first AOA measurement, taken by the UE at a first time, of RF signals received by the UE from a first base station; (ii) first sensor location information measured by one or more inertial sensors of the UE, where the first sensor location information is indicative of movement of the UE between the first time and a second time; and (iii) a second AOA measurement, taken by the UE at the second time, of RF signals received by the UE from a second base station. This functionality may correspond to action 1245 of FIG. 12. In some embodiments, the location server receives the location information from the UE at block 1410 using an LPP, LPP/LPPe or NPP protocol.

Depending on desired functionality, the contents of the location information can vary, as discussed herein above. For instance, in some embodiments, the location information may further comprise information indicative of the first time, the second time, and one or more times at which measurements associated with the first sensor location information were taken by the UE. Additionally or alternatively, the information indicative of the first AOA measurement and the second AOA measurement may comprise a DAOA measurement between the first base station and the second base station. In such instances, the information indicative of the first AOA measurement and the second AOA measurement may further comprise information indicative of a measurement of a second angle between the first base station and the second base station, where the measurement of the second angle can be independent of the DAOA measurement. This second angle may comprise an angle of elevation or an azimuth angle. In some embodiments, the first sensor location information may comprise information regarding the UE, including a velocity, acceleration, change in location, orientation, or change in orientation of the UE, or any combination thereof. Additionally or alternatively, the information indicative of the first AOA measurement and the second AOA measurement may be based on a common orientation for the UE at the first time and at the second time.

Figure 16:
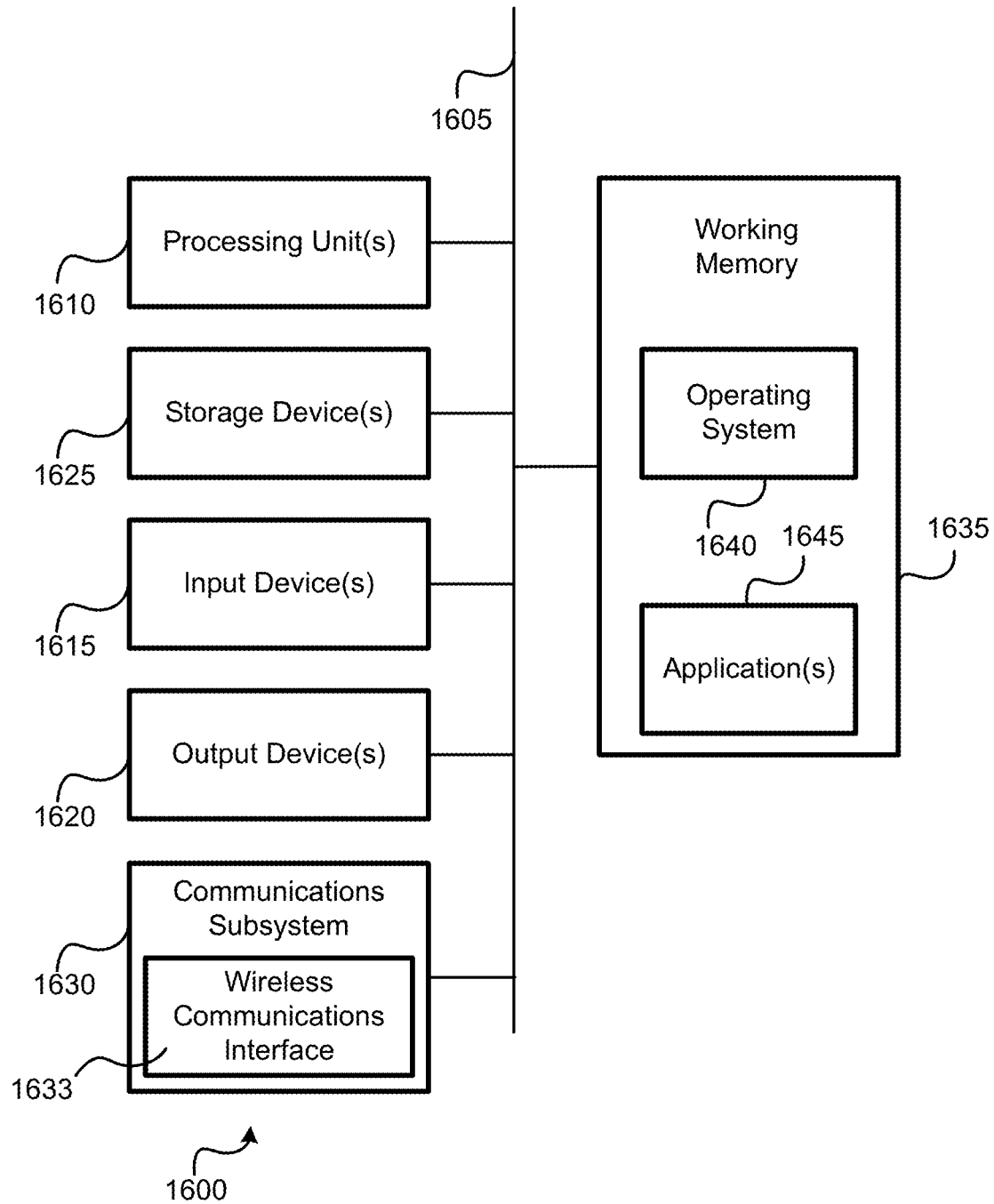
FIG. 16 is a block diagram of an embodiment of a computer system.

Means for performing the functionality at block 1410 can include, for example, processing unit(s) 1610, bus 1605, working memory 1635, communications subsystem 1630, and/or other hardware and/or software components of a computer system as shown in FIG. 16 and described below.

At block 1420, the functionality comprises determining, by the LS (e.g. as described for FIGS. 9A and 9B previously), a location of the UE based, at least in part, on the information indicative of the first AOA measurement, the first sensor location information, and the second AOA measurement. As noted above, this can be done in any of a variety of ways, depending on desired functionality. In some embodiments, for example, determining the location of the UE may further comprise assuming the UE, the first base station, and the second base station are on a common horizontal plane. Moreover, in some embodiments, in response to assuming the UE, the first base station, and the second base station are on the common horizontal plane, the method 1400 may further comprise calculating a two-dimensional location of the UE on the common horizontal plane (e.g., as part of determining the location of the UE). Additionally or alternatively, determining the location of the UE may further comprise recalibrating (e.g. adjusting or modifying) the first location sensor information based on assuming the UE, the first base station, and the second base station are on the common horizontal plane.

Some embodiments may also accommodate different locations of the UE, as described in the embodiments above. For instance, the UE may be at a first location at the first time (e.g. the location P0 in FIG. 9A or FIG. 9B) and at a second location (e.g. the location P1 in FIG. 9A or the location Q1 in FIG. 9B), different to the first location, at the second time. In such instances, the location information may further comprise information indicative of a third AOA measurement of RF signals received by the UE from a third base station, obtained by the UE at a third time (e.g. as at location P2 in FIG. 9A or as at one of the additional positions referred to for FIG. 9B), and second sensor location information indicative of movement of the UE between the second time and the third time. Here, determining the location for the UE at block 1420 can be further based, at least in part, on the information indicative of the third AOA measurement and the second sensor location information (e.g. as described previously here in association with FIGS. 9A and 9B). In some instances, the locations of the UE at the first time, the second time, and the third time, may all be different. Additionally or alternatively, the first base station may comprise a serving base station for the UE, and determining the location of the UE may further comprise: (i) verifying that the first base station is not on a common plane for the UE, the second base station and the third base station, where the verifying is based at least in part on the information indicative of the first AOA measurement, the second AOA measurement and the third AOA measurement; and (ii) determining the location of the UE based on a location of the first base station.

As indicated previously, some embodiments may also utilize non-AOA and non-DAOA measurements to determine the location of the UE. According to some embodiments, for example, the location information may further comprise information indicative of one or more non-AOA and non-DAOA measurements of RF signals received by the UE from one or more base stations, where the one or more non-AOA and non-DAOA measurements are taken by the UE at one or more times. Here, embodiments may further comprise determining, by the location server, the location of the UE based, at least in part, on the information indicative of the first AOA measurement, the first sensor location information, the second AOA measurement, and the one or more non-AOA and non-DAOA measurements. As noted above, non-AOA and non-DAOA measurements may comprise a TOA measurement, an RSTD measurement, an RTT measurement, an RSSI measurement, an RSRP measurement, an RSRQ measurement, or any combination thereof. In some embodiments the one or more base stations (from which the RF signals were received by the UE) may include the first base station, the second base station, or both base stations. Additionally or alternatively, the one or more times may include the first time, the second time, or both times.

In some embodiments, the location server may determine one or more first location relationships for the UE based on the information indicative of the first AOA measurement, the first sensor location information, the second AOA measurement, the third AOA measurement and the second sensor location information. The location server may further determine one or more second location relationships for the UE based on the one or more non-AOA and non-DAOA measurements. In such embodiments, determining the location for the UE may be based on a combination of one or more first location relationships and the one or more second location relationships. For example, the determining the location may be based on a least squares location for which the sum of the squares of the errors for each of the measurements is smallest, where an error corresponds to the minimum amount by which the least squares location is displaced from locations satisfying the one or more first location relationships and the one or more second location relationships.

Means for performing the functionality at block 1420 can include, for example, processing unit(s) 1610, bus 1605, working memory 1635, and/or other hardware and/or software components of a computer system as shown in FIG. 16 and described below.

FIG. 15 illustrates an embodiment of a UE 105, which can be utilized as described in the embodiments provided above and as described for FIGS. 1-14. It should be noted that FIG. 15 is meant only to provide a generalized illustration of various components of UE 105, any or all of which may be utilized as appropriate. In other words, because UEs can vary widely in functionality, they may include only a portion of the components shown in FIG. 15. It can be noted that, in some instances, components illustrated in FIG. 15 can be localized to a single physical device and/or distributed among various networked devices, which may be disposed at different physical locations.

The UE 105 is shown comprising hardware elements that can be electrically coupled via a bus 1505 (or may otherwise be in communication, as appropriate). The hardware elements may include a processing unit(s) 1510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 15, some embodiments may have a separate DSP 1520, depending on desired functionality. The UE 105 also may comprise one or more input devices 1570, which may comprise without limitation one or more touch screens, touch pads, microphones, buttons, dials, switches, and/or the like; and one or more output devices 1515, which may comprise without limitation, one or more displays, light emitting diode (LED)s, speakers, and/or the like.

The UE 105 might also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable to UE 105 to communicate via the networks described above with regard to FIG. 1. The wireless communication interface 1530 may permit data to be communicated with a network, an LS, wireless access points, other computer systems, and/or any other electronic devices described herein. The communication can be carried out via one or more wireless communication antenna(s) 1532 that send and/or receive wireless signals 1534. The one or more wireless communication antenna(s) 1532 may comprise one or more antenna elements to enable AOA and DAOA determination, as illustrated in FIGS. 4-6.

Depending on desired functionality, the wireless communication interface 1530 may comprise separate transceivers to communicate with base stations (e.g., base stations 120 of FIG. 1) and other terrestrial transceivers, such as wireless devices and access points (e.g., APs 130 of FIG. 1), which may be part of a wireless wide area network (WWAN) or a wireless local area network (WLAN). For example, a WWAN may be a Code Division Multiple Access (CDMA)

network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, NR and so on. LTE, LTE Advanced, NR, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The wireless communication interface 1530 may further enable location-related measurements to be obtained (e.g. AOA and/or DAOA measurements), as described elsewhere herein, of signals received from base stations and access points (e.g. base stations 120 and APs 130).

The UE 105 can further include sensor(s) 1540. Such sensors may comprise, without limitation, one or more inertial sensors (e.g., accelerometer(s), gyroscope(s), compass, magnetometer(s)) which may also be referred to as Inertial Measurement Units (IMUs), capable of obtaining movement or velocity-related measurements as described herein. The UE 105 may include additional sensors, such as camera(s), altimeter(s), barometer, thermometer, hygrometer, microphone(s), proximity sensor(s), light sensor(s), and the like, some of which may also provide information pertaining to the movement, orientation, or velocity-related and/or location-related measurements described herein.

Embodiments of UE 105 may also include a GNSS receiver 1580 capable of receiving signals 1584 from one or more GNSS satellites (e.g. SVs 110) using a GNSS antenna 1582 (which may be combined with antenna 1532 in some implementations). Such positioning can be utilized to complement and/or incorporate the techniques described herein. The GNSS receiver 1580 can receive, measure and/or decode RF signals from GNSS SVs of a GNSS system, such as GPS, Galileo, GLONASS, Quasi-Zenith Satellite System (QZSS) over Japan, Indian Regional Navigational Satellite System (IRNSS) over India, Beidou over China, and/or other such satellite positioning systems. Moreover, the GNSS receiver 1580 can be used to receive, measure and/or decode RF signals from various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 105 may further include and/or be in communication with a memory 1560. The memory 1560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 1560 may be used, among other things, to store assistance data (e.g. received from an LS 160) and/or location-related measurements and movement or velocity-related measurements (obtained by UE 105) using a database, linked list, or any other type of data structure. In some embodiments, wireless communication interface 1530 may additionally or alternatively comprise memory.

The memory 1560 of UE 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed herein might be implemented as code and/or instructions executable by UE 105 (and/or a processing unit within UE 105). In an aspect, then, such code and/or instructions can be used to configure and/or adapt a general purpose computer (or other device) to perform one or more operations in accordance with the described methods.

FIG. 16 illustrates an embodiment of a computer system 1600, which may be used, in whole or in part, to provide the functions of an LS as described in the embodiments above (e.g., LS 160 of FIGS. 1 and 12). It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner. In addition, it can be noted that components illustrated by FIG. 16 can be localized to a single device and/or distributed among various networked devices, which may be disposed at different geographical locations.

The computer system 1600 is shown comprising hardware elements that can be electrically coupled via a bus 1605 (or may otherwise be in communication, as appropriate). The hardware elements may include processing unit(s) 1610, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1600 also may comprise one or more input devices 1615, which may comprise without limitation a mouse, a keyboard, a camera, a microphone, and/or the like; and one or more output devices 1620, which may comprise without limitation a display device, a printer, and/or the like.

The computer system 1600 may further include (and/or be in communication with) one or more non-transitory storage devices 1625, which can comprise, without limitation, local and/or network accessible storage, and/or may comprise, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1600 might also include a communications subsystem 1630, which may comprise wireless communication technologies managed and controlled by a wireless communication interface 1633, as well as wired technologies (such as Ethernet, coaxial communications, universal serial bus (USB), and the like). Thus, the communications subsystem 1630 may comprise a modem, a network card (wireless or wired), an infrared communication device, a wireless communication device, and/or a chipset, and/or the like, which may enable the computer system 1600 to communicate on any or all of the communication networks described herein to any device on the respective network, including a UE (e.g. UE 105), other computer systems, and/or any other electronic devices described herein. Hence, the communications subsystem 1630 may be used to receive and send data as described in the embodiments herein.

In many embodiments, the computer system 1600 will further comprise a working memory 1635, which may comprise a RAM or ROM device, as described above. Software elements, shown as being located within the working memory 1635, may comprise an operating system 1640, device drivers, executable libraries, and/or other code, such as one or more applications 1645, which may comprise computer programs provided by various embodiments, and/or may be designed to implement methods, and/or configure systems, provided by other embodiments, as described herein. Merely by way of example, one or more procedures described with respect to the method(s) discussed herein might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1625 described above. In some cases, the storage medium might be incorporated within a computer system, such as computer system 1600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1600 and/or might take the form of source and/or installable code, which, upon compilation and/or installation on the computer system 1600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, firmware or software (including portable software, such as applets, etc.), or some combination of these. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of determining a location of a user equipment (UE), the method comprising:
    obtaining, with the UE at a first time, a first Angle Of Arrival (AOA) measurement of Radio Frequency (RF) signals received by the UE from a first base station;
    obtaining, using one or more inertial sensors of the UE, first sensor location information indicative of movement of the UE between the first time and a second time;
    obtaining, with the UE at the second time, a second AOA measurement of RF signals received by the UE from a second base station; and
    providing location information to a location determining entity, the location information comprising information indicative of the first AOA measurement, the first sensor location information, and the second AOA measurement.

2. The method of claim 1, wherein the location information further comprises information indicative of the first time, the second time, and one or more times at which measurements associated with the first sensor location information were taken.

3. The method of claim 1, further comprising:
    obtaining a differential AOA (DAOA) measurement between the first base station and the second base station based on the first AOA measurement and the second AOA measurement; and
    including, in the location information, information indicative of the DAOA measurement.

4. The method of claim 3, further comprising:
    obtaining a measurement of a second angle between the first base station and the second base station based on the first AOA measurement and the second AOA measurement, wherein the measurement of the second angle is independent of the DAOA measurement; and
    including, in the location information, information indicative of the measurement of the second angle.

5. The method of claim 1, wherein the UE comprises the location determining entity, and further comprising:
    determining a location for the UE based at least in part on the information indicative of the first AOA measurement, the first sensor location information, and the second AOA measurement.

6. The method of claim 1, wherein the first sensor location information comprises information regarding the UE including a velocity, acceleration, change in location, orientation, or change in orientation of the UE, or any combination thereof.

7. The method of claim 1, further comprising:
    adjusting the first AOA measurement, the second AOA measurement or both AOA measurements based on a common orientation for the UE at the first time and at the second time, wherein the location information is based on the common orientation for the UE.

8. The method of claim 1, wherein the UE is at a first location at the first time and at a second location, different to the first location, at the second time, and the method further comprises:
    obtaining, with the UE at a third time and at a third location, different to the first location and the second location, a third AOA measurement of RF signals received by the UE from a third base station;
    obtaining, using the one or more inertial sensors of the UE, second sensor location information indicative of movement of the UE between the second time and the third time; and
    including, in the location information, information indicative of the third AOA measurement and the second sensor location information, wherein the location determining entity determines a location for the UE based at least in part on the information indicative of the third AOA measurement and the second sensor location information.

9. The method of claim 1, further comprising:
obtaining, with the UE at one or more times, one or more non-AOA and non-Differential AOA (DAOA) measurements of RF signals received by the UE from one or more base stations; and
including, in the location information, information indicative of the one or more non-AOA and non-DAOA measurements.

10. The method of claim 9, wherein the one or more non-AOA and non-DAOA measurements comprise:
a Time Of Arrival (TOA) measurement,
a Reference Signal Time Difference (RSTD) measurement,
a Round Trip signal propagation Time (RTT) measurement,
a Received Signal Strength Indicator (RSSI) measurement,
a Reference Signal Received Power (RSRP) measurement,
a Reference Signal Received Quality (RSRQ) measurement, or
any combination thereof.

11. A method of determining a location of a user equipment (UE), the method comprising:
receiving, at a location server, location information from the UE, wherein the location information comprises information indicative of:
a first Angle Of Arrival (AOA) measurement, taken by the UE at a first time, of Radio Frequency (RF) signals received by the UE from a first base station;
first sensor location information measured by one or more inertial sensors of the UE, the first sensor location information indicative of movement of the UE between the first time and a second time; and
a second AOA measurement, taken by the UE at the second time, of RF signals received by the UE from a second base station; and
determining, by the location server, a location of the UE based, at least in part, on the information indicative of the first AOA measurement, the first sensor location information, and the second AOA measurement.

12. The method of claim 11, wherein determining the location of the UE further comprises assuming the UE, the first base station, and the second base station are on a common horizontal plane.

13. The method of claim 12, wherein determining the location of the UE further comprises, in response to assuming the UE, the first base station, and the second base station are on the common horizontal plane, calculating a two-dimensional location of the UE on the common horizontal plane.

14. The method of claim 11, wherein the location information further comprises information indicative of the first time, the second time, and one or more times at which measurements associated with the first sensor location information were taken by the UE.

15. The method of claim 11, wherein the information indicative of the first AOA measurement and the second AOA measurement comprises a differential AOA (DAOA) measurement between the first base station and the second base station.

16. The method of claim 15, wherein:
the information indicative of the first AOA measurement and the second AOA measurement further comprises information indicative of a measurement of a second angle between the first base station and the second base station, wherein the measurement of the second angle is independent of the DAOA measurement.

17. The method of claim 11, wherein the UE is at a first location at the first time and at a second location, different to the first location, at the second time, and the location information further comprises information indicative of:
a third AOA measurement of RF signals received by the UE from a third base station, obtained by the UE at a third time, and
second sensor location information indicative of movement of the UE between the second time and the third time;
wherein determining the location for the UE is further based at least in part on the information indicative of the third AOA measurement and the second sensor location information.

18. The method of claim 17 wherein the first base station comprises a serving base station for the UE, wherein determining the location of the UE comprises:
verifying that the first base station is not on a common plane for the UE, the second base station and the third base station, wherein the verifying is based at least in part on the information indicative of the first AOA measurement, the second AOA measurement and the third AOA measurement; and
determining the location of the UE based on a location of the first base station.

19. The method of claim 11, wherein the location information further comprises information indicative of one or more non-AOA and non-Differential AOA (DAOA) measurements of RF signals received by the UE from one or more base stations, the one or more non-AOA and non-DAOA measurements taken by the UE at one or more times, and wherein the method further comprises:
determining, by the location server, the location of the UE based, at least in part, on the information indicative of the first AOA measurement, the first sensor location information, the second AOA measurement, and the one or more non-AOA and non-DAOA measurements.

20. A user equipment (UE) comprising:
a wireless communication interface;
one or more inertial sensors;
a memory; and
one or more processing units communicatively coupled with the wireless communication interface, the one or more inertial sensors, and the memory, wherein the one or more processing units is configured to cause the UE to:
obtain, with the wireless communication interface at a first time, a first Angle Of Arrival (AOA) measurement of Radio Frequency (RF) signals received by the UE from a first base station;
obtain, using the one or more inertial sensors, first sensor location information indicative of movement of the UE between the first time and a second time;
obtain, with the wireless communication interface at the second time, a second AOA measurement of RF signals received by the UE from a second base station; and
provide location information to a location determining entity, the location information comprising information indicative of the first AOA measurement, the first sensor location information, and the second AOA measurement.

21. The UE of claim 20, wherein the one or more processing units is further configured to cause the UE to:
obtain a differential AOA (DAOA) measurement between the first base station and the second base station based on the first AOA measurement and the second AOA measurement; and
include, in the location information, information indicative of the DAOA measurement.

22. The UE of claim 21, wherein the one or more processing units is further configured to cause the UE to:
obtain a measurement of a second angle between the first base station and the second base station based on the first AOA measurement and the second AOA measurement, wherein the measurement of the second angle is independent of the DAOA measurement; and
include, in the location information, information indicative of the measurement of the second angle.

23. The UE of claim 20, wherein the UE comprises the location determining entity, and the one or more processing units is further configured to cause the UE to:
determine a location for the UE based at least in part on the information indicative of the first AOA measurement, the first sensor location information, and the second AOA measurement.

24. The UE of claim 20, wherein the one or more processing units is further configured to cause the UE to, when the UE is at a first location at the first time and at a second location, different to the first location, at the second time:
obtain, with the wireless communication interface at a third time and at a third location, different to the first location and the second location, a third AOA measurement of RF signals received by the UE from a third base station;
obtain, using the one or more inertial sensors, second sensor location information indicative of movement of the UE between the second time and the third time; and
include, in the location information, information indicative of the third AOA measurement and the second sensor location information.

25. The UE of claim 20, wherein the one or more processing units is further configured to cause the UE to:
obtain, with the UE at one or more times, one or more non-AOA and non-Differential AOA (DAOA) measurements of RF signals received by the UE from one or more base stations; and
include, in the location information, information indicative of the one or more non-AOA and non-DAOA measurements.

26. A location server for determining a location of a user equipment (UE), the location server comprising:
a communication subsystem;
a memory; and
one or more processing units communicatively coupled with the communication subsystem and the memory and configured to cause the location server to:
receive, using the communication subsystem, location information from the UE, wherein the location information comprises information indicative of:
a first Angle Of Arrival (AOA) measurement, taken by the UE at a first time, of Radio Frequency (RF) signals received by the UE from a first base station;
first sensor location information measured by one or more inertial sensors of the UE, the first sensor location information indicative of movement of the UE between the first time and a second time; and
a second AOA measurement, taken by the UE at the second time, of RF signals received by the UE from a second base station; and
determine a location of the UE based, at least in part, on the information indicative of the first AOA measurement, the first sensor location information, and the second AOA measurement.

27. The location server of claim 26, wherein the one or more processing units is configured to cause the location server to determine the location of the UE at least in part by assuming the UE, the first base station, and the second base station are on a common horizontal plane.

28. The location server of claim 26, wherein the one or more processing units is further configured to cause the location server to determine the location for the UE further based at least in part on information indicative of a third AOA measurement and second sensor location information, wherein:
the UE is at a first location at the first time and at a second location, different to the first location, at the second time,
the third AOA measurement is of RF signals received by the UE from a third base station, obtained by the UE at a third time, and
the second sensor location information is indicative of movement of the UE between the second time and the third time.

29. The location server of claim 28, wherein the first base station comprises a serving base station for the UE, and the one or more processing units is configured to cause the location server to determine the location of the UE at least in part by:
verifying that the first base station is not on a common plane for the UE, the second base station and the third base station, wherein the verifying is based at least in part on the information indicative of the first AOA measurement, the second AOA measurement and the third AOA measurement; and
determining the location of the UE based on a location of the first base station.

30. The location server of claim 26, wherein the location information further comprises information indicative of one or more non-AOA and non-Differential AOA (DAOA) measurements of RF signals received by the UE from one or more base stations, the one or more non-AOA and non-DAOA measurements taken by the UE at one or more times, and the one or more processing units is further configured to cause the location server to:
determine the location of the UE based, at least in part, on the information indicative of the first AOA measurement, the first sensor location information, the second AOA measurement, and the one or more non-AOA and non-DAOA measurements.

31. The method of claim 1, further comprising receiving, by the UE, a location information request from the location determining entity, wherein providing the location information to the location determining entity is responsive to the location information request.

32. The method of claim 11, further comprising sending, to the UE from the location server, a location information request, wherein the location information is received in response to the location information request.

33. The UE of claim 20, wherein the one or more processing units is further configured to cause the UE to receive, by the UE, a location information request from the location determining entity.

34. The location server of claim 26, wherein the one or more processing units is further configured to send, using the communication subsystem, a location information request to the UE.

* * * * *